US008713972B2

(12) United States Patent
Lakota et al.

(10) Patent No.: US 8,713,972 B2
(45) Date of Patent: *May 6, 2014

(54) PRECISION GLASS ROLL FORMING PROCESS AND APPARATUS

(75) Inventors: Alexander Lakota, Kanona, NY (US); William E. Lock, Horseheads, NY (US); Joel A. Schultes, Corning, NY (US); John C. Thomas, Elmira, NY (US)

(73) Assignee: Corning Incorporated, Corning, NY (US)

(*) Notice: Subject to any disclaimer, the term of this patent is extended or adjusted under 35 U.S.C. 154(b) by 73 days.

This patent is subject to a terminal disclaimer.

(21) Appl. No.: 13/483,774

(22) Filed: May 30, 2012

(65) Prior Publication Data

US 2012/0304695 A1 Dec. 6, 2012

Related U.S. Application Data

(60) Provisional application No. 61/491,651, filed on May 31, 2011.

(51) Int. Cl.
*C03B 13/04* (2006.01)
*C03B 13/16* (2006.01)
*C03B 17/06* (2006.01)

(52) U.S. Cl.
USPC .................. 65/185; 65/245; 65/253; 65/101; 65/99.1

(58) Field of Classification Search
CPC ...... C03B 17/068; C03B 13/04; C03B 13/16; C03B 13/18
USPC .......................................... 65/185, 245, 253
See application file for complete search history.

(56) References Cited

U.S. PATENT DOCUMENTS

| 1,447,702 | A | * | 3/1923 | Whittemore | 65/92 |
| 1,569,465 | A | * | 1/1926 | Drake | 65/95 |
| 1,593,567 | A | * | 7/1926 | Byrnes | 65/85 |
| 1,603,946 | A | * | 10/1926 | Gelstharp | 65/186 |
| 1,608,644 | A | * | 11/1926 | Black | 65/185 |
| 1,616,405 | A | * | 2/1927 | Avery | 65/65 |
| 1,772,072 | A | * | 8/1930 | Drake | 65/101 |
| 1,818,152 | A | * | 8/1931 | Nobbe | 65/101 |
| 1,829,409 | A | * | 10/1931 | Kingsley | 65/51 |
| 1,864,360 | A | * | 6/1932 | Lemaire | 65/185 |
| 3,226,219 | A | * | 12/1965 | Jamnik | 65/170 |
| 3,227,537 | A | * | 1/1966 | Novack | 65/101 |
| 3,446,275 | A | * | 5/1969 | Mitsugu et al. | 165/90 |

(Continued)

FOREIGN PATENT DOCUMENTS

| JP | 2002047019 | 12/2002 |
| WO | 2010/096630 | 8/2010 |

*Primary Examiner* — Jason L Lazorcik
(74) *Attorney, Agent, or Firm* — Robert P. Santandrea

(57) ABSTRACT

A process and apparatus for precision glass roll forming a supply of molten glass at a glass temperature of 1000° C. or higher. A pair of hot forming rolls having a surface temperature of about 500° C. or higher, vertically below the glass feed, that thin the supplied stream of molten glass to produce a formed glass ribbon. A pair of cold sizing rolls maintained at a surface temperature of about 400° C. or lower, vertically below the forming rolls, that thin the formed glass ribbon glass to produce a sized glass ribbon having a desired thickness and a desired thickness uniformity. The sized glass ribbon may have a thickness of 1 mm or less that varies in thickness by no more than +/−0.025 mm.

59 Claims, 18 Drawing Sheets

(56) References Cited

U.S. PATENT DOCUMENTS

| | | | |
|---|---|---|---|
| 3,660,066 A * | 5/1972 | Pfluger | 65/94 |
| 3,841,857 A * | 10/1974 | Harcuba | 65/94 |
| 4,462,456 A * | 7/1984 | Kameyama et al. | 164/448 |
| 6,896,646 B2 * | 5/2005 | Kaiser et al. | 492/40 |
| 7,284,328 B2 * | 10/2007 | Kaiser | 29/895.21 |
| 2004/0093900 A1 | 5/2004 | Fredholm | 65/25.3 |
| 2010/0281921 A1 | 11/2010 | Bisson et al. | 65/101 |
| 2011/0239708 A1 * | 10/2011 | Nishiura et al. | 65/199 |
| 2013/0133369 A1 * | 5/2013 | Lock | 65/60.1 |

* cited by examiner

PRECISION GLASS ROLL FORMING PROCESS AND APPARATUS

CROSS-REFERENCE TO RELATED APPLICATIONS

This application claims the benefit of priority under 35 U.S.C. §119 of U.S. Provisional Application Ser. No. 61/491,651 filed on May 31, 2011, the content of which is hereby incorporated by reference.

BACKGROUND

The disclosure relates to roll forming of sheet glass, and more particularly to a method and apparatus for precision roll forming thin glass sheets with high precision thickness/dimensional uniformity, and more particularly to such a method and apparatus in which a stream of molten glass at a relatively high glass temperature greater than about 1000° C. or higher is formed by a first forming roll pair at a relatively high/hot surface temperature (500° C. or higher) and is then precisely sized by a precision dimensioned roll pair at a relatively low/cold surface temperature (400° C. or lower).

Historically, rolled sheet glass is typically formed using one pair of hot forming rolls. The first pair of forming rolls can be oriented such that the formed sheet glass exits the rolls either horizontally or vertically, or sometimes at angles between horizontal or vertical. In a conventional horizontal or angled glass forming system, a stream or sheet of hot molten glass is typically delivered to the lower forming roll (just ahead of the nip of the rolls) from, for example, an overflow weir. In a vertical glass forming system, a stream or sheet of hot molten glass is typically fed vertically down onto one of the forming rolls from a slot orifice or overflow weir. The exiting glass sheet can be fed directly into a heat treatment lehr or roller hearth to anneal the newly formed sheet.

Conventional rolling machines are normally single-purpose pieces of equipment that are relatively large and bulky machines built for a single glass forming process that produces a single type of glass sheet within relatively small compositional, viscosity, width and thickness ranges. Moreover, conventional glass roll forming machines that typically employ a single pair of hot forming rolls, produce a sheet glass that does not have a high precision of dimensional uniformity, e.g. does not have thickness uniformity at a high level of precision within +/−0.025 mm") and unable to form thin glass below 2-3 mm in thickness. One factor that contributes to this lack of precise thickness control is the uneven thermal expansion of the hot forming rolls. When the hot forming rolls are heated to their operating surface temperature of 500° C. or higher, the hot forming rolls expand/swell. The uneven thermal expansion of the hot forming rolls makes it difficult to maintain a precisely dimensioned cylindrical glass forming surface on the hot forming rolls. As a result, the sheet of glass exiting the hot forming rolls does not have a high precision of thickness uniformity.

Compounding the thermal expansion problem with conventional hot forming rolls is the fact that heat from the high temperature of the molten stream of glass, which may be about 1000° C. or higher, raises the temperature of a central portion of the hot forming rolls to a higher temperature than the end portions of the hot forming rolls, causing the central portion of the hot forming rolls to expand more than the end portions. This uneven expansion of the hot forming rolls can be at least partially compensated for by forming the central portion of the hot forming rolls with a smaller diameter, such that the central portion of the hot forming rolls have a concave bow at room temperature. The concave bow can be designed to substantially counteract the greater thermal expansion that occurs in the central portion of the hot forming rolls at the elevated operating temperatures during glass fabrication compared to the thermal expansion of the end portions, such that when the hot forming rolls expand at operating temperature the rolls will be substantially cylindrical. Selective heating and cooling of the central and end portions of the hot forming rolls, as is well understood in the art, may additionally or alternatively be employed to minimize the temperature and thermal expansion variations in the hot forming rolls during hot roll forming of glass. Nevertheless, even with such steps, it has heretofore been extremely difficult if not impossible to form thin glass with a high precision thickness uniformity using forming rolls.

Fusion draw forming of glass produces wide, thin glass sheets with a high precision of thickness control and surface finish, such as Eagle™ glass from Corning Incorporated. However, fusion forming is typically limited to the formation of glass having viscosity above about 100,000 poise or more and produces sheets with relatively thick undesirable "edge beads" that need to be removed.

There is a need in the art for a precision glass forming process and apparatus that is capable of precision forming glass and glass ceramic compositions that cannot be fusion formed. There is also a need in the art for a process that is capable of precision forming thin glass sheets at a higher flow rate (process speed) than is possible with current fusion forming and roll forming processes. There is also a need in the art for a roll forming process and apparatus that is capable of precision forming a wide range of glass compositions having a wide range of viscosities into thin glass sheets having a relatively high precision thickness uniformity.

SUMMARY

Embodiment hereof include a process and apparatus for precision glass roll forming that includes a glass feed device for supplying a stream of molten glass at a temperature of 1000° C. or higher. A pair of hot forming rolls maintained at a surface temperature of about 500° C. or higher or 600° C. or higher located vertically below the glass feed device receives the supplied stream of molten glass and forms the supplied stream of molten glass into a formed ribbon of glass having a thickness near a desired thickness. A pair of cold sizing rolls maintained at a surface temperature of about 400° C. or lower, 300° C. or lower, or 200° C. or lower located vertically below the forming rolls receives the formed ribbon of glass and thins the formed ribbon of molten glass to produce a sized ribbon of glass having a desired thickness and a desired thickness uniformity. The thickness of the sized ribbon of glass varies by no more than +/−0.025 mm. The sized ribbon of glass produced by the sizing rolls may be a relatively thin glass ribbon or sheet having a thickness of 1 mm or less, or 0.8 mm or less, or 0.75 mm or less.

A pair of pulling rolls may be located vertically below the sizing rolls for receiving the sized ribbon of glass and creating a tension on the sized ribbon of glass.

The glass feed device may feed the stream of molten glass to the forming rolls at a glass temperature of about 1000° C. or higher.

The sizing rolls may each have an outer surface formed of a heat insulating material or coated with a heat insulating material to provide a thermal barrier. The outer surface may be formed of a ceramic material, or a combination of ceramic materials.

The sizing rolls may each be formed of a hollow cylinder of heat insulating material. A cooling tube may supply cooling fluid to an interior of each sizing roll. The coolant tube may be a spray tube that extends substantially the entire length of the interior of the hollow cylinder, and a plurality of spray holes are formed along the spray tube for spraying cooling fluid against an interior surface of the hollow cylinder. There my be a higher concentration of spray holes in a central region of the spray tube than in end regions of the spray tube, whereby a central region of the hollow cylinder receives a larger volume of cooling fluid than end regions of the hollow cylinder.

An embodiment may include a frame; a left upper (and optional lower) sizing roll support shaft that has inner and outer ends, and right upper and optional lower sizing roll support shaft that has inner and outer ends, the left and the right upper sizing roll support shafts being horizontally and slidingly mounted in the frame parallel to each other and at the same height, with a first of the sizing rolls rotationally mounted on the outer ends of the upper sizing roll support shafts; a left sizing roll middle shaft that has inner and outer ends and right sizing roll middle support shaft that has inner and outer ends, the left and the right sizing roll middle support shafts being horizontally and slidingly mounted in the frame parallel to each other and at the same height, with a second of the sizing rolls mounted on the outer ends of the middle sizing roll support shafts; a first translational drive device for driving one of (i) the upper sizing roll support shafts, and therefore the first sizing roll, and (ii) the middle sizing roll support shafts, and therefore the second sizing roll, forward and back relative to the frame in a direction opposite to the direction that the other, whereby the first sizing roll and the second sizing rolls are selectively moved (i) together to define a desired gap between the sizing rolls and (ii) apart.

A synchronizing mechanism for ensuring synchronous movement of the upper sizing roll support shafts with the movement of the middle sizing roll support shafts may include gear teeth on a side of one of the upper sizing roll support shafts facing the middle sizing roll support shafts; gear teeth on a side of one of the middle sizing roll support shafts facing the upper sizing roll support shafts; and a first pinion gear rotationally mounted to the frame, the pinion gear engaging the gear teeth on the one of the upper sizing roll support shafts and engaging the gear teeth on the one of the middle sizing roll support shafts.

The synchronizing mechanism may further include a torsion rod rotationally mounted to the frame, and wherein the first pinion gear is affixed to the torsion rod, and a second pinion gear is affixed to the torsion rod, the second pinion gear engages the gear teeth on an other one of the upper sizing roll support shafts and engages the gear teeth on an other one of the middle sizing roll support shafts, and thereby ensures synchronous movement of the left side sizing roll support shafts with the movement of the right side sizing roll support shafts, such that the first and second sizing rolls move parallel to each other.

A forming process according to an embodiment hereof may include the steps of: supplying a stream of molten glass; forming the supplied stream of molten glass with a pair of hot forming rolls maintained at a surface temperature of about 500° C. or higher to form a formed ribbon of glass having a thickness near a desired thickness; sizing formed ribbon of glass with a pair of cold sizing rolls maintained at a surface temperature of about 400° C. or lower, 300° C. or lower, or 200° C. or lower to produce a sized ribbon of glass having a desired thickness and a desired thickness uniformity. The thickness of the sized ribbon of glass may vary by no more than +/−0.025 mm. The sized ribbon of glass produced by the sizing rolls may have a thickness of 1 mm or less, or 0.8 mm or less, or 0.75 mm or less. The glass feed device may feed the stream of molten glass to the forming rolls at a glass temperature of about 1000° C. or higher, for example at a glass temperature on the range of from about 1000° C. to about 1500° C.

An embodiment of the glass or glass-ceramic roll forming apparatus may include a glass feed device for supplying a supplied stream of molten glass. A pair of hot forming rolls maintained at a surface temperature of about 500° C. or higher, the forming rolls being spaced closely adjacent each other defining a glass forming gap between the forming rolls with the glass forming gap located vertically below the glass feed device for receiving the supplied stream of molten glass and thinning the supplied stream of molten glass between the forming rolls to form a formed glass ribbon of glass having a formed thickness near a desired thickness. A pair of cold sizing rolls maintained at a surface temperature of about 400° C. or lower, the sizing rolls being spaced closely adjacent each other defining a glass sizing gap between the sizing rolls with the glass sizing gap located vertically below the forming rolls for receiving the formed glass ribbon of glass and thinning the formed glass ribbon of molten glass to produce a sized glass ribbon of glass having a desired thickness and a desired thickness uniformity. The molten glass may be fed to the forming rolls at a surface molten glass temperature of about 1000° C. or higher. The molten glass may be fed to the forming rolls at a glass viscosity in a range of from about 200 poise to about 10,000 poise.

In some embodiments, the outer cylindrical glass sizing surfaces of each of the sizing rolls are formed with a radius and concentricity with the rotational axis of the sizing roll that varies by no more than +/−0.0125 mm, whereby the thickness of the sized glass ribbon of glass varies by no more than +/−0.025 mm.

In some embodiments, the sizing gap has a thickness of 1 mm or less, whereby the sized glass ribbon of glass produced by the sizing rolls has a thickness 1 mm or less. The sizing gap may have a thickness of 0.8 mm or less, whereby the sized glass ribbon of glass produced by the sizing rolls has a thickness 0.8 mm or less. The forming gap may have a thickness of about 1.5 mm to about 2 mm.

Some embodiments include a pair of pulling rolls located vertically below the sizing rolls for receiving the sized glass ribbon of glass and creating a sufficient tension on the sized glass ribbon of glass to at least one of (i) stabilize and (ii) draw the sized glass ribbon of glass.

In some embodiments, the roll forming apparatus includes a first pair of spacer rings mounted adjacent each end of a first of the sizing rolls and a second pair of spacer rings mounted adjacent each end of a second of the sizing rolls. A translational drive device presses the first and second sizing rolls together with the first pair of spacer rings engaging the second pair of spacer rings and thereby precisely defining a glass sizing gap between the pair of sizing rolls. The spacer rings may be precision formed to define the glass sizing gap with a width of about 1 mm or thinner, 0.8 mm or thinner, or 0.7 mm or thinner when the pair of sizing rolls are pressed together and the outer peripheral surface of each of the ceramic outer cylinders may be precision formed with a surface concentricity variation of no more than +/−0.0125 mm.

In some embodiments, the pair of sizing rolls include a first sizing roll and a second sizing roll and are included in a sizing roll module, the sizing roll module further including a frame. The frame includes a left first upper sizing roll support shaft having inner and outer ends and a right second upper sizing roll support shaft have inner and outer ends, the left first sizing roll support shaft and the right second upper sizing roll support shafts being horizontally and slidingly mounted in the frame parallel to each other and at the same height, with the first of the sizing rolls rotationally mounted on the outer ends of the upper first and second sizing roll support shafts. A left third sizing roll middle support shaft having inner and outer ends and a fourth sizing roll middle support shaft having inner and outer ends, the left third sizing roll support shaft and the right fourth sizing roll middle support shafts being horizontally and slidingly mounted in the frame parallel to each other and at the same height below the first and second sizing roll support shafts, with the second of the sizing rolls mounted on the outer ends of the middle third and fourth sizing roll support shafts at the same height as and parallel to the first sizing roll. A sizing module translational drive device for driving one of (i) the upper first and second sizing roll support shafts, and therefore the first sizing roll, and (ii) the middle third and fourth sizing roll support shafts, and therefore the second sizing roll, forward and back relative to the frame. A synchronizing mechanism for driving the other one of (i) the upper first and second sizing roll support shafts, and therefore the first sizing roll, and (ii) the middle third and fourth sizing roll support shafts, and therefore the second sizing roll, forward and back relative to the frame, forward and back relative to the frame in a direction opposite to the direction of the one of (i) the upper first and second sizing roll support shafts, and therefore the first sizing roll, and (ii) the middle third and fourth sizing roll support shafts, and therefore the second sizing roll, forward and back relative to the frame, are translationally driven, whereby the first sizing roll and the second sizing rolls are selectively moved (i) together to define a desired glass sizing gap between the sizing rolls and (ii) apart.

The synchronizing mechanism may include first gear teeth on a side of one of the upper first sizing roll support shafts facing the third middle sizing roll support shafts; third gear teeth on a side of one of the middle third sizing roll support shafts facing the upper first sizing roll support shafts; and first pinion gear rotationally mounted to the frame in engagement with, the pinion gear engaging the first gear teeth on the one of the upper sizing roll support shafts and engaging the third gear teeth on the one of the middle sizing roll support shafts, thereby ensuring that the first and second sizing rolls move in synchronicity with each other.

The synchronizing mechanism may also include second gear teeth on a side of the second sizing roll support shaft facing the fourth sizing roll support shaft; fourth gear teeth on a side of the fourth sizing roll support shaft facing the second sizing roll support shafts;

a torsion rod rotationally mounted to the frame. The first pinion gear is affixed to the torsion rod and a second pinion gear is affixed to the torsion rod, with the second pinion gear in engagement with the third gear teeth and on an other one of the upper sizing roll support shafts and the fourth gear teeth on an other one of the middle sizing roll support shafts, and thereby ensures that the first and second sizing rolls move parallel to and in synchronicity with each other.

The roll forming apparatus may include at least two said sizing roll modules, one located vertically below the other and aligned on the same vertical plane. The roll forming apparatus may include a forming roll module.

The forming roll module may include a forming roll frame; a first forming roll support shaft having inner and outer ends and a second forming roll support shaft have inner and outer ends. The first forming roll support shaft and the second forming roll support shaft being horizontally and slidingly mounted in the frame parallel to each other and at the same height, with the first forming roll rotationally mounted on the outer ends of the first and second forming roll support shaft.

A third forming roll shaft having inner and outer ends and a fourth forming roll support shaft have inner and outer ends. The third forming roll support shaft and the fourth forming roll support shafts being horizontally and slidingly mounted in the frame parallel to each other and at the same height below the first and second forming roll support shafts, with the second forming roll mounted on the outer ends of the third and fourth forming roll support shafts at the same height as and parallel to the first forming roll. A forming module translational drive device for driving one of (i) the first and second forming roll support shafts, and therefore the first forming roll, and (ii) the third and fourth forming roll support shafts, and therefore the second forming roll, forward and back relative to the frame. A synchronizing mechanism may be provided for driving the other one of (i) the first and second forming roll support shafts, and therefore the first forming roll, and (ii) the third and fourth forming roll support shafts, and therefore the second forming roll, forward and back relative to the frame in a direction opposite the direction of the one of (i) the upper forming roll support shafts, and therefore the first forming roll, and (ii) the lower forming roll support shafts, and therefore the second forming roll, are translationally driven, whereby the first forming roll and the second forming rolls are selectively moved (i) together to define a desired gap between the forming rolls and (ii) apart. In some embodiments hereof, threads may be included on one of (i) the first and second sizing roll support shafts and (ii) the third and fourth sizing roll support shafts and a threaded locking collar on the threads that contacts the frame to stop the motion of the sizing rolls toward each other and thereby define a desired sizing gap between sizing rolls. A collar drive device may be included that turns the locking collar on the threads and thereby adjusting the thickness of the desired sizing gap between the sizing rolls. A sensor may be included that detects the thickness of the sized glass ribbon and the collar drive device turns the locking collar in response to the thickness of the sized glass ribbon detected by the sensor to maintain the sized glass ribbon thickness within acceptable limits.

The roll forming apparatus may be formed of a plurality of modules, including at least one forming roll module containing the pair of forming rolls and at least one sizing roll module containing the pair of sizing rolls, whereby the glass ribbon forming operation is separated from the glass ribbon sizing operation. There may be at least two sizing roll modules arranged one below the other, whereby a partially sized ribbon of glass from a first of the sizing roll modules is received by the sizing rolls of a second of the sizing roll modules to produce the sized glass ribbon of glass. There maybe at least two forming roll modules arranged one below the other, whereby a partially formed ribbon of glass from a first of the forming roll modules is received by the forming rolls of a second of the forming roll modules to produce the formed glass ribbon of glass.

The roll forming apparatus may include a glass take out device located below the one or more sizing roll modules for receiving the sized glass ribbon, the glass take out device comprising one of a plurality of (i) vacuum glass forming molds on a conveyor and (ii) a flat conveyor.

In some embodiments, a first pair of bearing blocks may be rotationally mount a first of the sizing rolls, and a second pair of bearing blocks may rotationally mount a second of the sizing rolls. A translational drive device for moving the first pair of bearing blocks and the second pair of bearing blocks toward and away each other; and a plurality of pairs of shims of varying thickness for selectively placing a select pair of shims having a select thickness between the first pair of bearing blocks and the second pair of bearing blocks, whereby when the translational drive device moves the first pair of bearing blocks and the second pair of bearing blocks toward each other into engagement with the select pair of shims a glass sizing gap having a select thickness is formed between the sizing rolls.

In some embodiments, a glass or glass-ceramic roll forming process includes the steps of: supplying a vertical stream of molten glass; forming the supplied stream of molten glass or glass-ceramic with a pair of hot forming rolls maintained at a surface temperature of about 500° C. or higher or about 600° C. or higher to form a formed glass ribbon of glass having a formed thickness near a desired thickness; sizing the formed ribbon of glass with a pair of cold sizing rolls maintained at a surface temperature of about 400° C. or lower, about 300° C. or lower, or about 200° C. or lower to produce a sized glass ribbon of glass having a desired thickness less than the formed thickness and a desired thickness uniformity. The thickness uniformity of the sized glass ribbon of glass may vary by no more than +/−0.025 mm. The sized glass ribbon of glass produced by the sizing rolls may have a thickness of 1 mm or less, or 0.8 mm or less. The formed glass ribbon may have a thickness of about 1.5 mm to about 2 mm. The stream of molten glass may be fed to the forming rolls at a surface glass temperature of about 1000° C. or higher. The molten glass may be supplied at a glass viscosity in a range of from about 200 poise to about 10,000 poise.

The molten glass may be supplied to a center a nip formed between the pair of forming rolls such that a puddle of molten glass is formed at the nip of the forming rolls. The puddle of molten glass may have a thickness of about 10 mm to about 20 mm.

All embodiments hereof may include pulling the sized glass ribbon and creating a sufficient tension on the sized glass ribbon to at least one of (i) stabilize and (ii) draw the sized glass ribbon.

The pair of forming rolls and the pair of sizing rolls may be centered on vertical plane defined by the vertical stream of molten glass.

The glass sizing rolls may be rotationally driven at a higher speed than the glass forming rolls to at least one (i) create a vertical tension in the formed glass ribbon and (ii) draw the formed glass ribbon.

A rotational drive device mechanism may be included for rotationally driving the pair of sizing rolls. The rotational drive device mechanism may include a Schmidt coupling that couples the rotational drive device mechanism to the pair of sizing rolls, whereby the pair of sizing rolls are rotationally driven with no velocity variations in the rotational speed of the sizing rolls. The rotational drive mechanism in each module may rotationally drive the rolls in the corresponding module that is independently and separately controlled from the drive rotational mechanisms of the other modules. A controller may control one of the rotational speed and torque of each of the rolls in each of the modules. Each of the modules may include sensors that sense the rotational speed and/or torque of each rolls in the corresponding module and sends a corresponding signal to the controller and, in response to the signal, the controller controls one of the speed and the torque of each roll to be within a desired operational range.

A cutting roll module having a pair of cutting rolls may be located below the sizing roll module, and at least one of the cutting rolls has a cutter for cutting a glass sheet from the glass ribbon. The rotational speed of the cutting rolls may be controlled while the cutter is disengaged from the glass ribbon such that a desired length glass sheet is cut from the glass ribbon.

A temperature of the surface of at least one of the forming rolls and the sizing rolls may be sensed by sensors. The surface temperature of at least one of the forming rolls and the sizing rolls may be controlled in response to the temperature sensed by the sensors.

At least one of the forming rolls may have a central portion having a smaller outer diameter than outer portions of the forming rolls, whereby that the glass ribbon is formed with a central region that is thicker than outer regions of the glass ribbon. In all embodiments hereof the forming step may form a glass ribbon having a central portion with a greater thickness than outer edge portions of the glass ribbon.

In all embodiments hereof, the glass supplying step may supply one of (i) a variable flow of glass and (ii) a discontinuous flow of glass. The pair of sizing rolls may be rotationally driven with no velocity variations in the rotational speed of the sizing rolls.

All embodiments hereof may include the step of controlling the rotational velocity or torque of each of pair the rolls independently and separately from the other pairs rolls.

A pair of cutting rolls may be located below the sizing rolls, at least one of the cutting rolls having a cutter for cutting a glass sheet from the glass ribbon, and a step of controlling the rotational speed of the pair of cutting rolls while the at least one cutter is disengaged from the glass ribbon such that a desired length glass sheet is cut from the glass ribbon.

The pair of glass forming rolls may be spaced to define a glass forming gap between the glass forming rolls and the pair of glass sizing rolls are spaced to define a glass sizing gap between the glass sizing rolls that is smaller than the glass forming gap.

Additional features and advantages will be set forth in the detailed description which follows, and in part will be readily apparent to those skilled in the art upon reviewing the detailed description, appended drawings and claims contained herein, or by practicing the embodiments as described herein.

It is to be understood that both the foregoing general description and the following detailed description are merely exemplary, and are intended to provide an overview or framework to understanding the nature and character of the claims. The accompanying drawings are included to provide a further understanding, and are incorporated in and constitute a part of this specification. The drawings illustrate one or more embodiment(s), and together with the description serve to explain principles and operation of the various embodiments.

DETAILED DESCRIPTION

Figure 1:
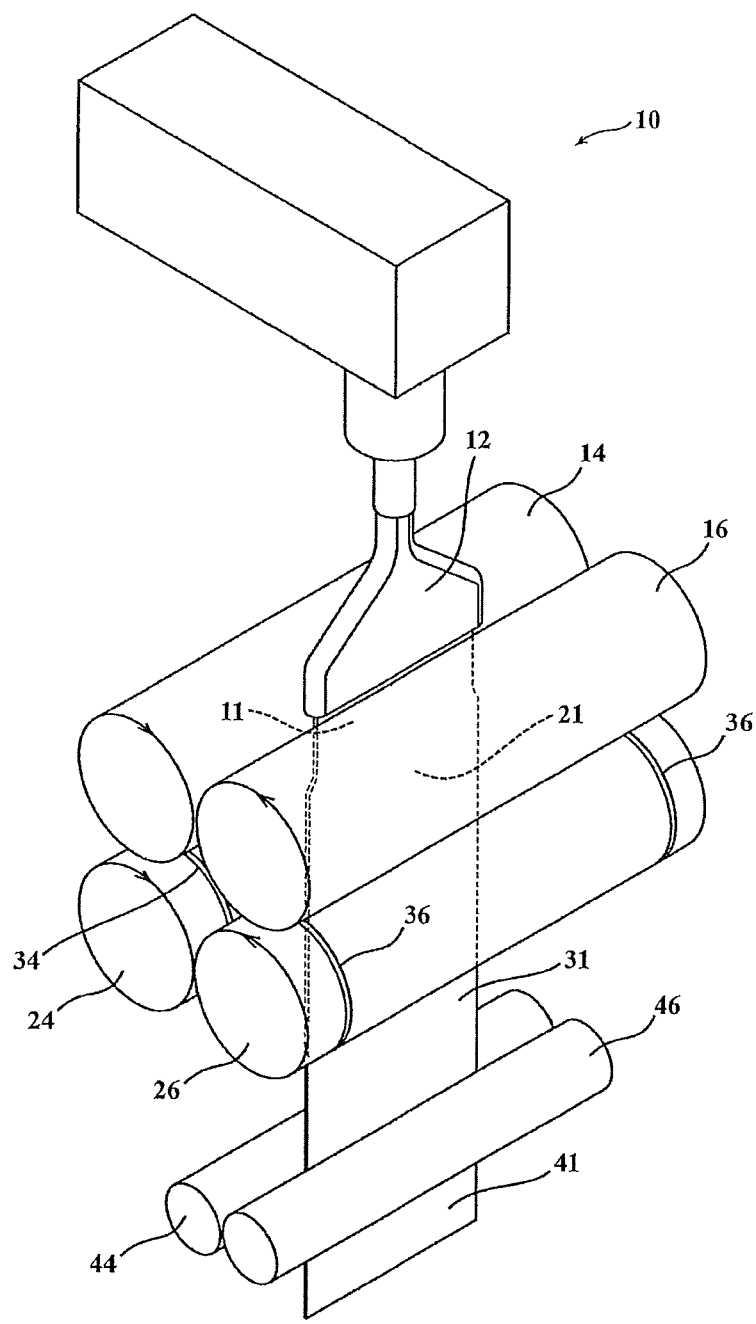
FIG. 1 is a schematic perspective view of one embodiment of a high precision glass roll forming apparatus and process according to one embodiment hereof.

Reference will now be made in detail to present preferred embodiments, examples of which are illustrated in the accompanying drawings. Whenever possible, the same reference numerals will be used throughout the drawings to refer to the same or like parts. One embodiment of a high precision glass roll forming apparatus and process for producing very thin, precision thickness sheet glass is schematically illustrated in FIG. 1, and is designated generally throughout by the reference numeral 10.

As used in this description and the appended claims, the term "thin" or "very thin" as used in relation to glass sheets means a sheet of glass having a thickness of about 1 mm or less, or about 0.8 mm, or less, or 0.75 mm or less.

As used in this description and the appended claims, the term "precision thickness" as used in relation to a glass sheet means a sheet of glass having a substantially uniform thickness that varies by no more than +/−0.025 mm.

Figure 2:
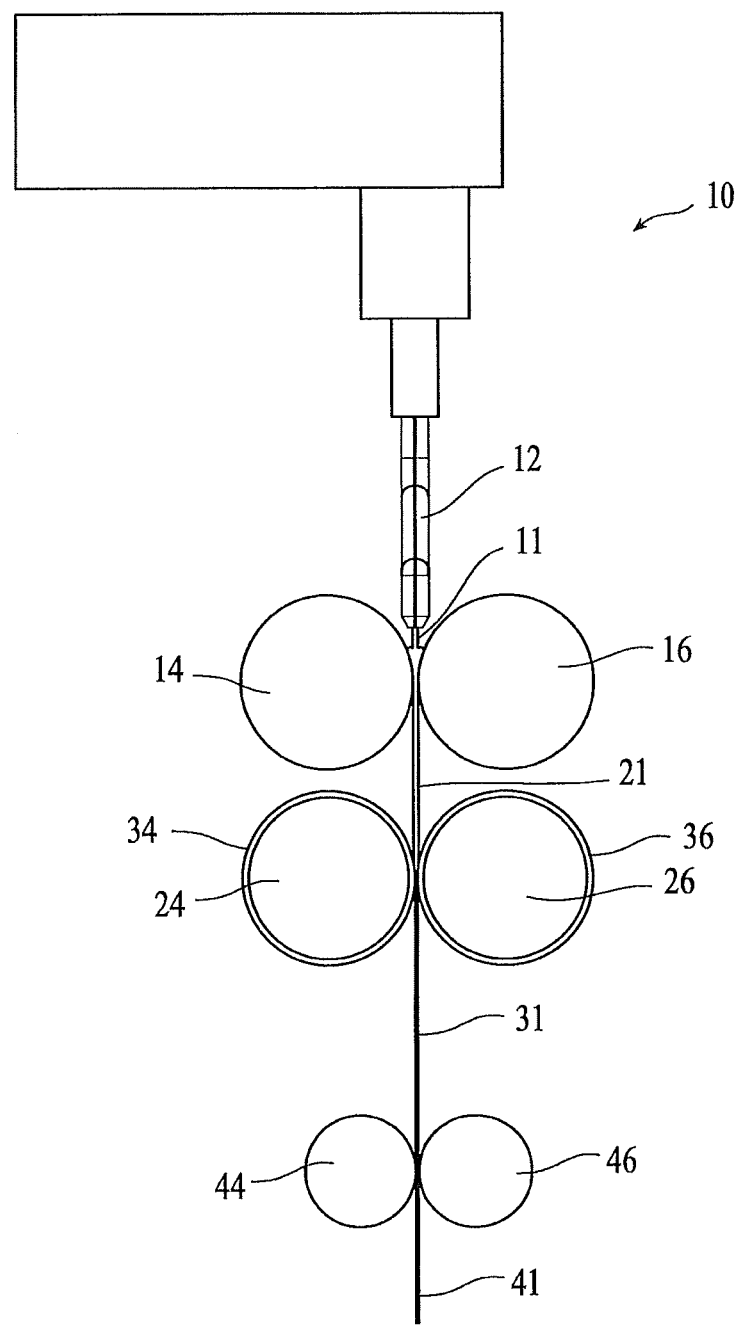
FIG. 2 is a schematic side view of the high precision glass roll forming apparatus and process of FIG. 1.

Referring now to FIGS. 1 and 2, a stream of molten glass 11 may be delivered, by way of example only, from a fish tail or feed slot 12 to the center of a nip between a first pair of forming rolls 14 and 16. The slot orifice may have wide ranges of widths/lengths and thicknesses. The stream of glass may be delivered to the nip of a first pair of forming rolls 14 and 16 at a glass temperature of about 1000° C. or higher. The first pair of forming rolls are conventional hot forming rolls that are temperature controlled at a surface temperature in a range from about 500° C. to about 600° C., or higher, depending on the composition and viscosity of the glass being formed. Processes and devices for the temperature control of forming rolls are well understood in the art and are therefore not described in detail herein. The first/hot forming rolls flatten, thin, and smoothen the stream of molten glass 11 into a flat sheet of glass 21 having a thickness of about 1.5 mm to about 2 mm, for example.

The forming rolls 14 and 16 may be formed out of steel. The forming surface of the hot forming rolls may be contoured slightly to compensate for thermal expansion of the hot forming rolls caused by the delivery of the hot glass to the nip of the rolls. The contour may be tapered or variable such that a central portion of the forming rolls are thinner, e.g. have a smaller outer diameter, than outer or edge portions of the forming rolls, such that the glass sheet 21 exiting the hot forming rolls is slightly thicker in the central region of the glass sheet than at the outer or edge portions, in order to avoid the "dog bone" glass ribbon shape effect where the glass ribbon is formed thicker near the side edges of the ribbon than in the middle. If the glass ribbon is formed thicker in the outer or edge regions of the glass ribbon, then wrinkles or waves may be formed in the glass ribbon when the glass ribbon is sized by the sizing rolls as described hereinafter. As is understood in the art, the rotational speed and temperature of the forming rolls, and the size of the gap between the forming rolls are carefully selected and controlled to produce a glass ribbon 21 with the desired width and thickness.

The glass sheet 21 exiting the hot forming rolls 14 and 16 is then delivered to the center of a nip between a second pair of forming rolls 24 and 26. The second pair of forming rolls 24 and 26 are precision dimensioned sizing rolls that further form and thin the glass sheet 21 to the desired precision thickness/size, e.g. size the glass sheet. The sizing rolls 24 and 26 are temperature controlled to a relatively cold surface temperature, compared to conventional forming rolls, of 400° C. or lower, or 300° C. or lower, or 200° C. or lower, or about 100° C. to about 400° C., or about 100° C. to about 300° C., or about 100° C. to about 200° C. The temperature of the surface of the sizing rolls should be as low as the glass composition and process/apparatus configuration allows. The outer glass sizing surfaces of the cold sizing rolls are precision dimensioned cylinders that are formed with size and runout (e.g. the radius and concentricity of the outer sizing surface about the rotational axis of the roll) having tolerances of no more than +/−0.0125 mm. The outer glass forming surface of the cold sizing rolls are formed of or coated with a thermally insulating material. For example, the outer glass forming surface of the cold forming rolls may be formed by a ceramic insulating cylinder, sleeve or coating. The insulating cylinder provides a thermal barrier that minimizes the amount of heat that is transferred from the ribbon of hot molten glass to the cold forming rolls. The thermal barrier provided by the insulating cylinder allows the sizing rolls to be run at less than 200° C., or even less than 100° C. without cracking or checking the glass sheet or ribbon due to too rapid cooling of the glass. Operating the sizing rolls at less than 200° C. or less than 100° C. also results in negligible changes in the profile of the outer glass forming surface of the sizing rolls 24 and 26 due to thermal expansion (during operation the temperature of the sizing rolls is not increased as much as the temperature of the forming rolls), such that precision thickness control of the formed ribbon can be achieved solely by cold roll sizing of the molten glass ribbon with no subsequent finishing operations on the produced glass sheet.

Forming the glass into a relatively thick glass sheet of about 1.5 mm to about 2 mm at the forming rolls leaves enough mass of molten glass in the formed glass sheet having sufficient thermal energy in center of the sheet to reheat the outer regions of the glass sheet that have been cooled by contact with the forming rolls. Such reheating of the outer regions of the glass sheet allows the glass sheet to be optionally drawn and thinned between the forming rolls and the sizing rolls and to be sized at the sizing rolls.

Precision dimensioned spacer rings 34 and 36 may be mounted near the ends of each sizing roll 24 and 26. The spacer rings are precision machined to have a cylindrical outer surface within a tolerance of no more than +/−0.0125 mm. As will be described in more detail herein after, the sizing rolls are pressed together such that the spacer rings 34 on sizing roll 24 are contacting and pressing against the spacer rings 36 on sizing roll 26. In this manner, precision gap control between the sizing rolls 34 and 36 is reliably achieved, regardless of any thermal expansion of the bearing blocks or support structure. Spacer rings may be optionally used on the hot forming rolls 14 and 16 as well. The formed glass ribbon 21 is further thinned and precision formed by the sizing rolls 34 and 36 into very thin (for example about 1 mm thick or thinner, 0.8 mm thick or thinner, or 0.75 mm thick or thinner) sized glass ribbon 31 with a precision thickness within a tolerance of no more than +/−0.025 mm. As is understood in the art, the rotational speed and surface temperature of the sizing rolls, and the size of the gap between the sizing rolls are carefully selected and controlled to produce a glass ribbon 31 with the desired width and precision thickness. Two or more pairs of sizing rolls (only one pair is illustrated) may be employed in serial fashion, one below the other, if necessary, in order to form a very thin glass sheet with a high precision thickness, as well as for thermal control, guidance and flatness considerations.

One or more pairs of conventional pulling rolls 44 and 46 may optionally be provided below the sizing rolls 34 and 36 in order to pull downward on the glass ribbon 31 and generate a slight tension in the glass ribbon 31 in order to stabilize the glass ribbon, stretch the glass ribbon 31, isolate the glass stream 11 and glass ribbon 21 in the glass forming region from downstream processes, maintain flatness of the glass ribbon 31, or further thin the glass ribbon to form glass ribbon 41. The surface material and texture of these pulling rolls must be chosen appropriately to not adversely affect the desired surface finish of the precision formed/dimensioned glass ribbon/sheet 41. The glass ribbon 31 or 41 is then cooled down and delivered to a take-out mechanism, where the glass ribbon is cut into individual glass sheets of the desired size. The take out mechanism may be a travelling anvil for scoring and breaking sheets of glass from the bottom of the traveling sheet of glass and a robotic arm with a Bernoulli chuck for removing the separated glass sheet from the glass forming apparatus, or the glass take out mechanism may be a horizontal conveyor that transports the glass ribbon to downstream glass processing stations, such as glass cutting, finishing (edge and surface), or shaping stations.

The molten glass stream 11 may be fed to the center of the nip of the hot forming rolls 14 and 16 using any suitable glass delivery method. For example, the molten glass may be delivered to the forming rolls in batches from a crucible or a pre-shaped ladle; or the molten glass may be continuously fed to the forming rolls as a stream of glass from a fishtail orifice, slot orifice, fusion forming isopipe, or an extrusion furnace.

Figure 3:
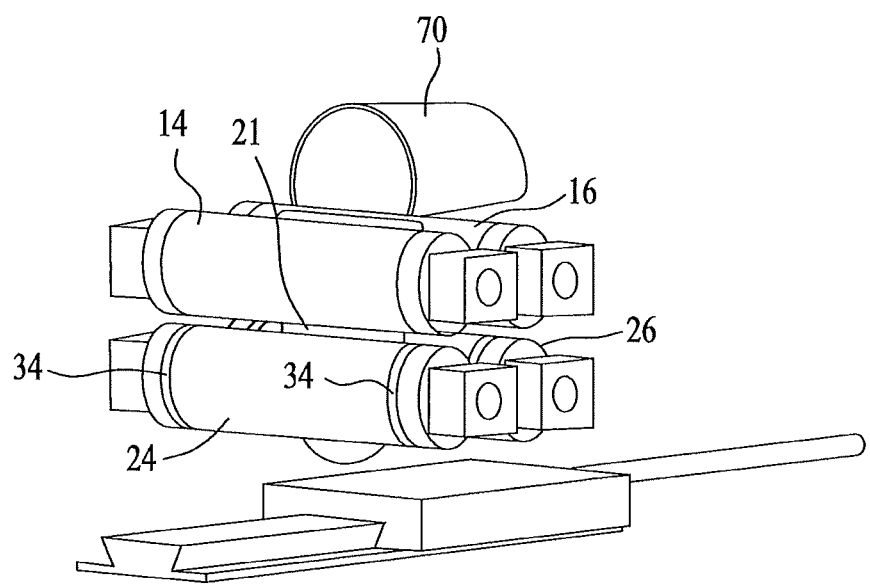
FIG. 3 is a schematic perspective view of an embodiment of the high precision glass roll forming apparatus of FIG. 1 with a crucible or ladle feed.

As schematically illustrated in FIG. 3, a ladle or crucible 70 may be employed to feed batches of molten glass into the nip of the hot forming rolls 14 and 16. The ladle 70 is filled with molten glass in a known manner. The ladle of molten glass is then moved into place above the nip of the hot forming rolls 14 and 16, and the ladle is tipped and the molten glass is poured into the nip of the hot forming rolls 14 and 16. The ladle may be tipped in a controlled manner such that the glass pours from the ladle at a desired rate of flow for forming a desired width ribbon of glass with the forming rolls 14 and 16. Alternatively, depending on the volume of the ladle relative to the length of the forming rolls 14 and 16, the ladle may quickly dump its contents of molten glass onto the nip of the forming rolls 14 and 16, forming a puddle of molten glass on the nip of the forming rolls. Molten glass from the puddle is then drawn down by gravity and the rotating glass forming surface of the forming rolls and formed into a formed glass ribbon 21. However, it may be difficult to control the width of the glass ribbon 21 in such a process where the glass is dumped all at once from the ladle.

Figure 4:
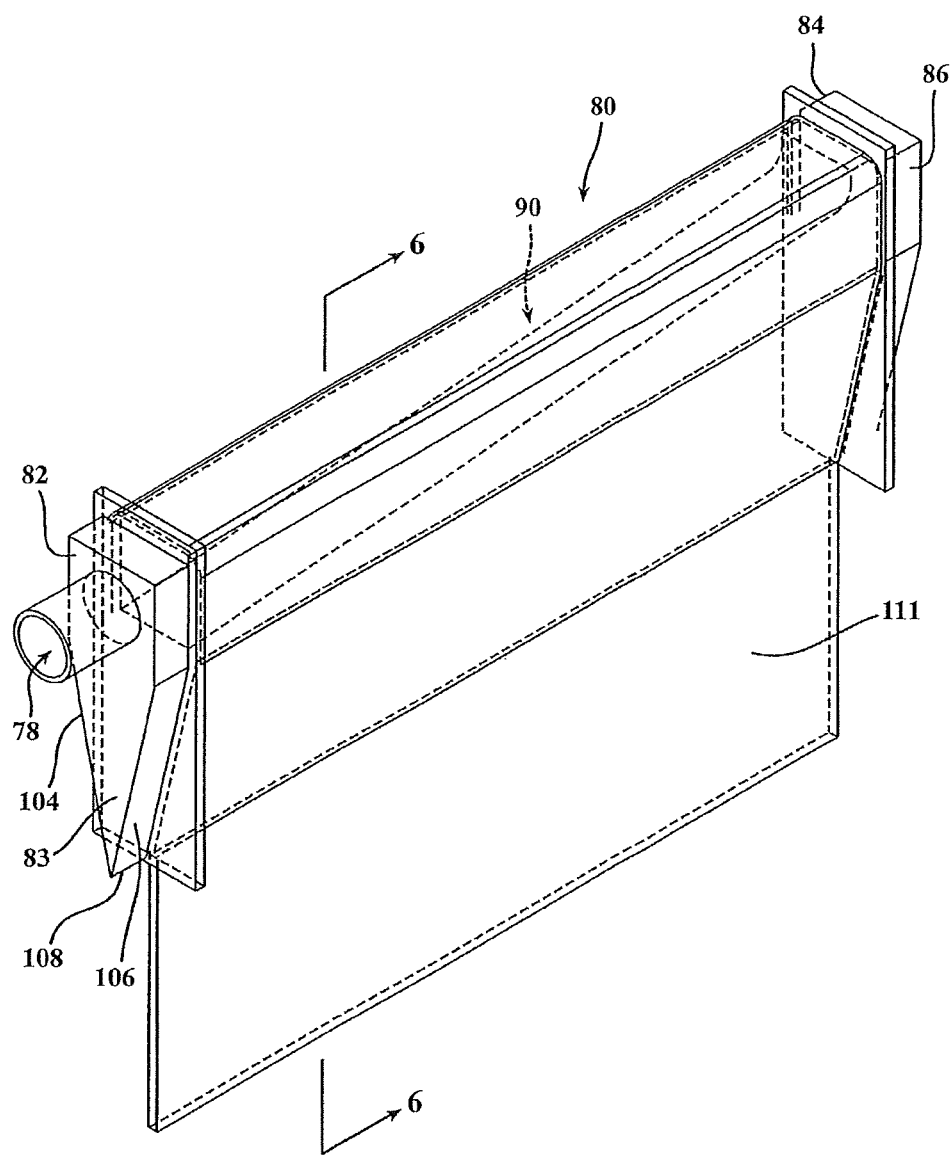
FIG. 4 is a schematic perspective view of an embodiment of a fusion forming glass feed that may be used to continuously feed glass to the high precision glass roll forming apparatus of FIG. 1.
Figure 5:
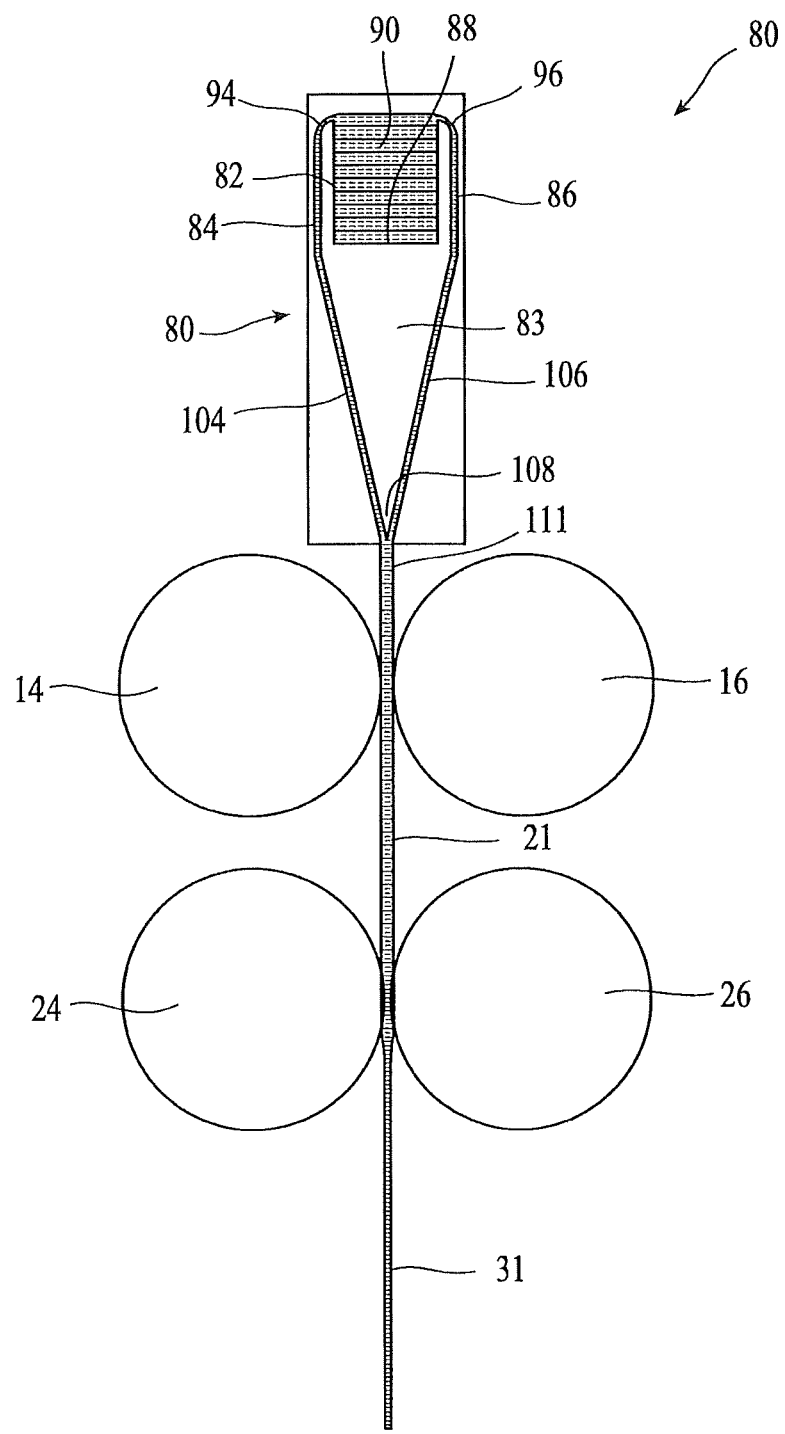
FIG. 5 is a schematic side view of the fusion forming glass feed of FIG. 4.

FIGS. 4 and 5 schematically illustrate an isopipe 80 of a continuous fusion draw glass forming process. The isopipe 80 comprises an upper trough-shaped part 82 and a lower wedge-shaped part 83, which, in combination, form a unitary forming body 80. The trough-shaped part comprises a first trough side wall having a first internal trough side surface, a second trough side wall having a second internal trough side surface, and a trough bottom surface 88, which together define an open channel (also called a "trough") 90 into which glass melt is introduced, typically through an inlet tube 78 or open end of the trough. The trough is filled with molten glass and the molten glass is allowed to flow over a first trough top surface 94 of the first trough wall and a second trough top surface 96 of the second trough wall as two separate glass ribbons, down along a first external trough side surface 84 and a second external trough side surface 86, and further down along a sloping first wedge side surface 104 connecting with the first external trough side surface 84, and a sloping second wedge side surface 106 connecting with the second external trough side surface 86. At the root 108 where the two wedge side surfaces 104 and 106 join, the two glass ribbons fuse to form a unitary glass ribbon 111, which is fed into the nip of the forming rolls 14 and 16.

The glass melt should overflow the first and second trough top surfaces 94 and 96 and cover them continuously to form a smooth and continuous glass ribbon. Likewise, the glass ribbons flowing down the external side surfaces 84, 86, 104, and 106 of the isopipe should cover the entire side surfaces (subject to physical restrictions by other isopipe accessories, such as the end-caps and edge directors, and the like) without significant thickness variation from one end of the isopipe to the other. Desirably, the glass melt flow in the two ribbons is consistent and stable over an extended period of time so that a glass sheet can be reliably produced at the root of the isopipe. At the beginning of a forming campaign, it may take some time for the glass flows to establish full, stable and consistent ribbons with desirable thickness and flow rate.

Variations in the flow rate and distribution of the glass melt along the full length of the first and second trough top surfaces affects the thickness and thickness variation of the final glass sheet to be produced at the bottom of the draw. Therefore, in order to increase the overall yield of the glass during a full campaign, the initial start-up period required to establish a stable glass ribbon should be as short as possible in order to minimize the amount of scrap or waste glass created during start-up. Use of the forming rolls and glass sizing rolls of the glass forming apparatus hereof can compensate for variations on the flow rate and thickness of the glass ribbon/stream 111 (or glass stream 11 as previously described). The control scheme for the feed of glass to the isopipe can therefore be simplified and less stringently controlled. Also, the start-up period may be shortened without affecting the stability and quality of the precision thickness glass ribbon 111 (or glass stream 11 as previously described) and creating less scrap glass during start-up. Yields can therefore be increased and operating costs reduced with the glass forming apparatus and process described herein compared to conventional precision thickness glass forming apparatus and processes.

Use of an isopipe or overflow pipe to fusion form and feed a glass ribbon 111 into the nip of the forming rolls enables the precision thickness forming of larger width glass sheets than is possible with a slot feed arrangement. For example glass ribbons having a width of about up to 10 feet wide have been produced by Corning Incorporated using isopipe or overflow pipe fusion draw glass forming processes. Slot feed arrangement are typically limited to the formation of glass ribbons having a width of 600 mm to 900 mm or less.

Figure 6A:
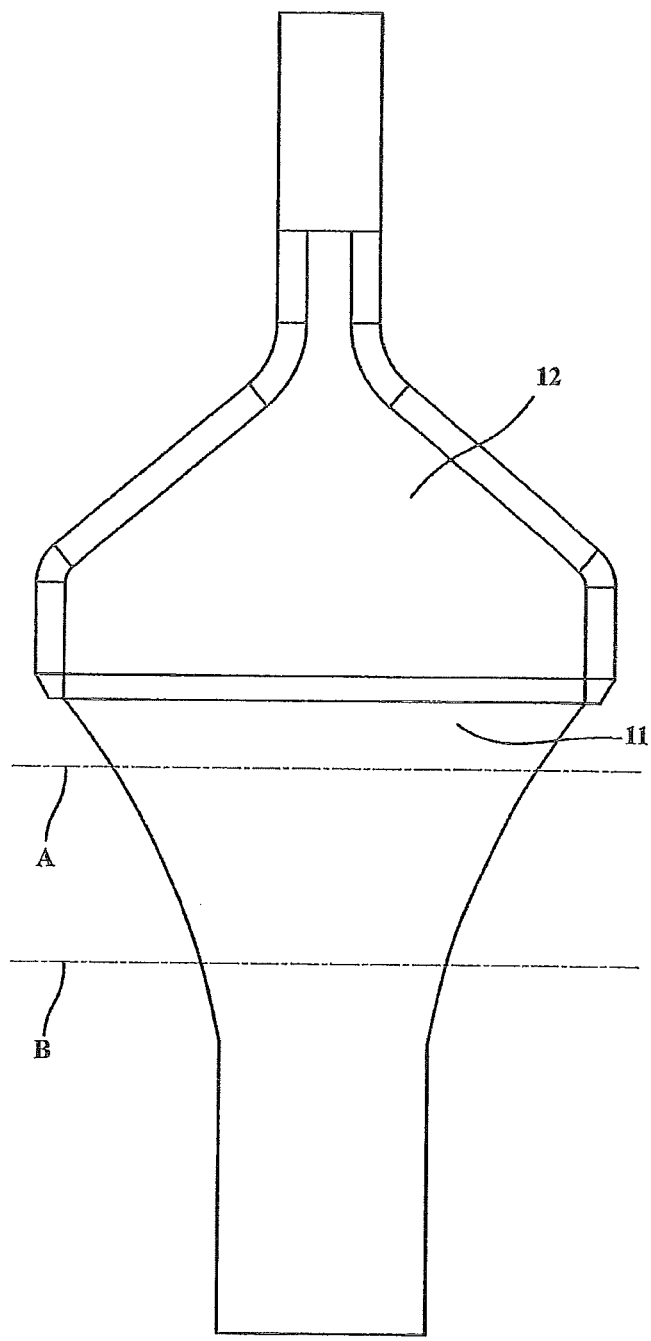
FIGS. 6A and 6B are schematic front and side views, respectively, illustrating the glass feed from a fish tail slot feed embodiment hereof.

By placing the glass feed slot 12 or root 108 of the isopipe as close to the nip of the forming rolls 14 and 16 as possible, thin glass having a relatively low viscosity at the delivery temperature of about 1000° C. or higher (for example, from about 1000° C. to about 1500° C.) at the nip of the forming rolls 14, 16 may be employed to form glass sheets with the roll forming apparatus described herein. For example, glass and glass-ceramic compositions having a viscosity of about 200 poise, as well as glass and glass-ceramic compositions having a viscosity as high as about 10,000 poise or higher at the delivery temperature may be precision thickness formed with the precision glass roll forming apparatus as described and illustrated herein. Such low viscosity glass compositions cannot be formed using conventional slot draw and fusion draw processes, because the molten glass stream/ribbon 11, 21, 31, 111 becomes unstable under its own weight and/or the tension applied to the molten glass ribbon in such processes and loses its shape. Also, as schematically illustrated on FIG. 6A, the width of the glass sheet produced may be maximized by placing the glass feed slot 12 or root 108 of the isopipe as close to the nip of the forming rolls 14 and 16 as possible, in order to minimize the time that the glass stream 11 or ribbon 111 has to attenuate before being formed by the forming rolls. For example, by placing the nip of the forming rolls 14, 16 at line A, the glass stream 11 or ribbon 111 is wider when it is delivered to the forming rolls than when the nip of the forming rolls is placed at line B in FIG. 6A. Once the glass has been formed by the forming rolls 14, 16, the width of the glass ribbon 21, 31 is substantially constant during the remainder of the glass forming and sizing process and tends not to further attenuate.

Figure 6B:
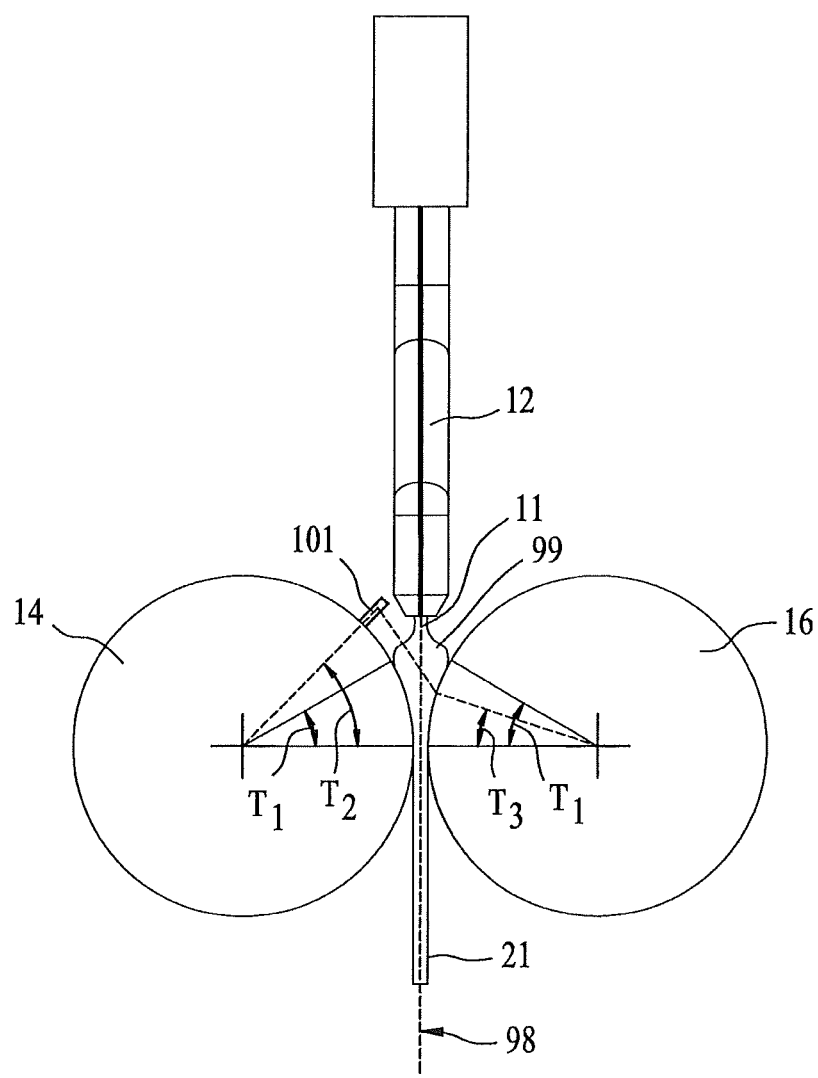

As illustrated in FIG. 6B it is advantageous to feed the stream of molten glass 11 to the center of the nip between forming rolls 14, 16, as illustrated by dashed line 98. By centering the stream of glass 11 between the forming rolls 14, 16, both sides of the stream of glass 11 are in contact with the corresponding forming roll for the same amount of time and distance (as schematically illustrated by arcs $T_1$ in FIG. 6B) and are therefore cooled to the same extent during glass forming. If the stream of molten glass 11 is fed to the forming roll off to one side of the nip as illustrated by the dashed line 101 in FIG. 6B, as is common in horizontal glass roll forming processes, then one side of the stream of glass will contact one of the forming rolls 14 higher up/sooner than the other side of the stream of glass contacts the other forming roll. As a result, one side of the stream of glass 11 will be in contact with the corresponding forming roll 14 for a longer time and distance $T_2$ than the other side of the stream of glass is in contact with the other forming roll 16 ($T_3$). One side of the stream of glass 11 will therefore be cooled by contact with the corresponding forming roll to a lower temperature during forming by the forming rolls than the other side of the glass ribbon. This unbalanced cooling creates thermal stresses in the glass ribbon 21 that can cause the glass ribbon to buckle or fold, forming ripples in the resulting glass ribbon 21.

It may be advantageous to form a small puddle of molten glass 99 at the nip of the forming rolls 14 and 16 as illustrated in FIG. 6B. By providing a buffer quantity of glass at the nip of the forming rolls, the puddle may help ensure that a glass ribbon 21 having a substantially constant thickness is formed by the forming rolls. This buffer quantity of glass provides a small reservoir of glass that is available at the nip to compensate for variations in the flow rate or thickness of the stream of molten glass 11 being fed to the nip of the forming rolls 14 and 16. Without such a puddle or reservoir of glass, should the flow rate of the glass stream 11 temporarily drop, then there may not be enough glass at the nip of the forming rolls to produce a uniformly thick glass ribbon 21. The ribbon 21 may then be formed with thin sections that are thinner than desired and thinner than the rest of the glass ribbon 21. With precise glass feed control, it is possible to feed a stream of glass 11 having a substantially constant flow rate and form a substantially constant width glass ribbon 21 with the forming rolls without forming a puddle 99 at the forming roll nip, such as is illustrated in FIG. 5. The puddle of glass can provide a reservoir of glass between batches of glass or at low glass feed rates. In this way, the present glass roll forming system can effectively uncouple the glass feed rate from the glass forming process speed or rate. In this way, variable flow rate and even discontinuous or batch glass feed systems with a dwell time between feed batches may be employed to supply/feed selectable quantities of glass on demand to the glass roll forming system hereof. The puddle may also optionally be completely depleted between batch feeds of glass. As is understood in the art, the rotational speed and surface temperature of the forming rolls, the size of the gap between the forming rolls, and the glass feed temperature/viscosity and flow rate are carefully selected and controlled to produce a glass ribbon 21 with the desired width and thickness.

As described above, forming a puddle of glass at the nip of the forming rolls has benefits, but the larger the puddle then the longer the molten glass is in contact with the forming rolls and the more the outer regions of the sheet of glass is cooled by contact with relatively cooler forming rolls. The viscosity of the glass increases as it cools, thereby making it harder to draw and thin the sheet of glass between the forming and sizing rolls and to thin and size the stream of glass at the sizing rolls. As such, the size of the puddle should be kept relatively small, for example, a puddle having a thickness of about 12 mm to about 18 mm may be formed, so that the glass sheet can be effectively redrawn and sized. In fact, in some instances, it may be advantageous to not form a puddle at the nip of the forming rolls.

Figure 7:
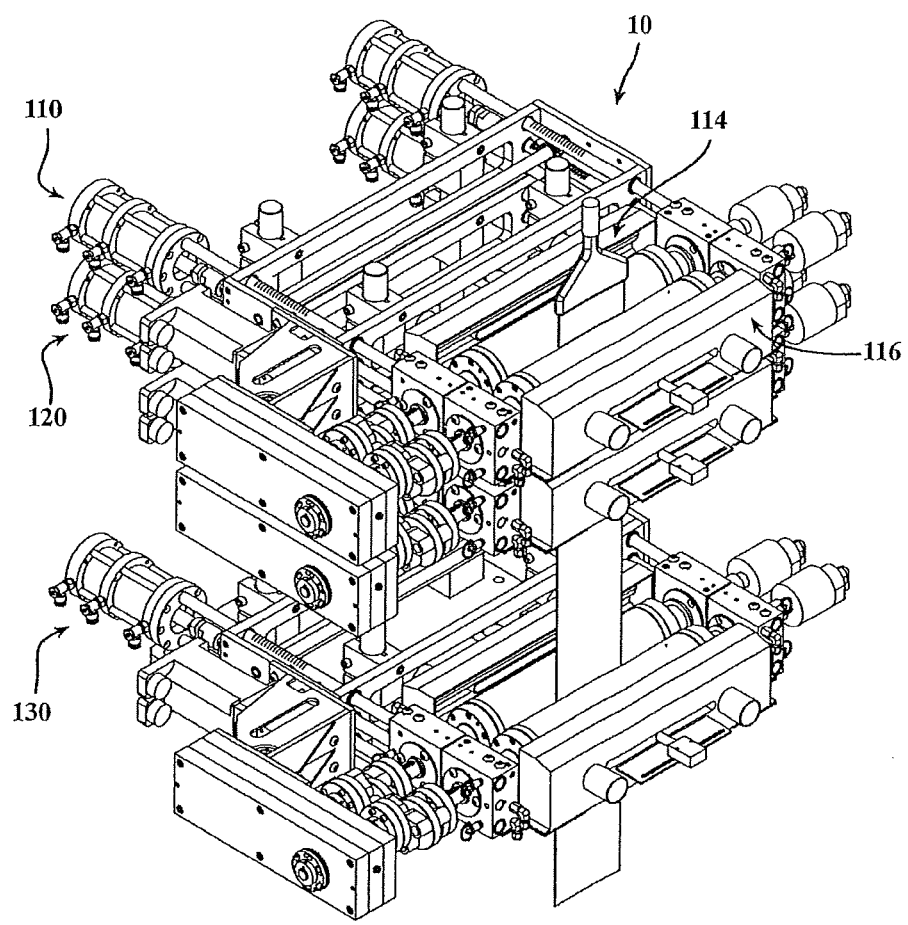
FIG. 7 is a perspective view of an embodiment of a high precision glass roll forming apparatus hereof.

An embodiment of a precision glass forming apparatus 10 will now be described with reference to FIGS. 7-14. As illustrated in FIG. 7, the precision glass forming apparatus 10 may include a glass forming module 110, a glass sizing module 120, and an optional glass pulling module 130. The forming rolls 14, 16 are part of the forming module 110, the sizing rolls 24, 26 are part of the sizing module 120, and optional pull rolls 44, 46 are part of the pulling module 130. The forming module, the sizing module and the optional pulling modules may be arranged one below the other with the nips of each pair of rolls centered on and aligned with the same vertical plane (e.g. the vertical plane defined by the stream of glass being fed to the forming rolls or by the nip of the forming rolls), such that the glass stream/ribbon is fed precisely to the center of the nip defined by each pair of rolls.

With the exception of the forming, sizing and pulling rolls, the glass forming, sizing and pulling modules 110, 120 and 130 may be substantially identical. As such, only the locating and driving module 120 for the sizing rolls 24 and 26 are illustrated in the appended drawings and described herein in detail with reference to FIGS. 8-14. It will be appreciated that the references to the sizing rolls 24 and 26 in relation to FIGS. 8-14 in the following description of the sizing roll module should also be interpreted as references to the forming rolls 14, 16 and the pulling rolls 34, 36 in roll forming module and optional pulling roll module, respectively. The modules 110, 120, and 130 described are simple, low-cost, low-profile, stackable modules that in combination, as described by way of example herein, form a versatile roll forming apparatus or system. The entire thickness or height of each of the individual modules may only be about 114 mm. Each module may include optional radiant roll heaters 114 and 116 to facilitate the temperature control of the rolls. It will be appreciated that the modules described in detail herein are just one representative arrangement that may be used to mount, align, move and control the forming, sizing and pulling rolls of the present disclosure. One of skill in the art may design and build other arrangements or systems for mounting, aligning, moving and controlling the forming and sizing rolls without departing from the scope to the present description and appended claims.

As shown in FIGS. 8-11, the sizing module 120 includes pneumatic cylinders 128, a frame 131, a translational drive motor 132, an upper shaft 158, lower shaft 159 and a middle shaft 161. The pneumatic cylinders 128, or other suitable translational drive devices such as hydraulic cylinders, electric stepper or servo motors, or any other translational drive devices capable of creating a satisfactory translational drive force, move the sizing rolls toward one another. As the sizing rolls move toward one another, spacer rings 34, 36 on the sizing rolls 24, 26 come into contact against each other and precisely form/define the gap between the forming surfaces of the sizing rolls 24, 26. The pneumatic air cylinders are mounted to the back side of the module, e.g. the side away from the heat from the molten glass ribbon.

Figure 13:
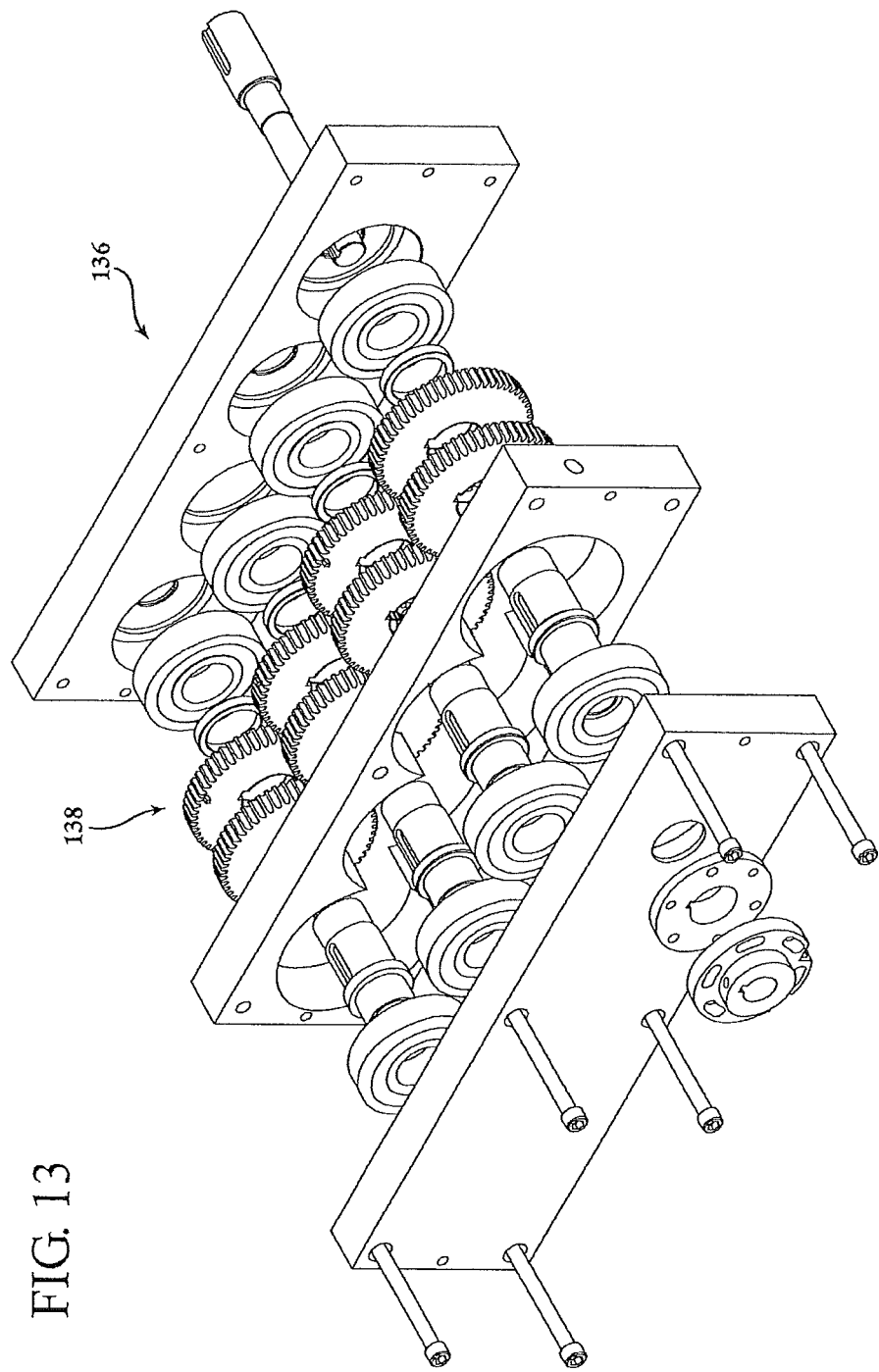
FIG. 13 is an exploded view of an embodiment of a gear box for driving the rolls of the sizing roll module of FIG. 8.
Figure 14:
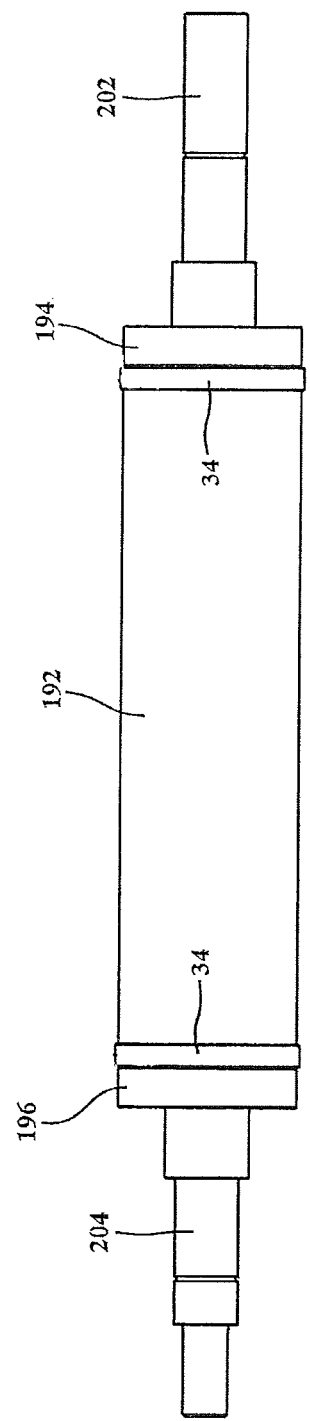
FIGS. 14 and 15 are an embodiment of a precision cold sizing roll.
Figure 15:
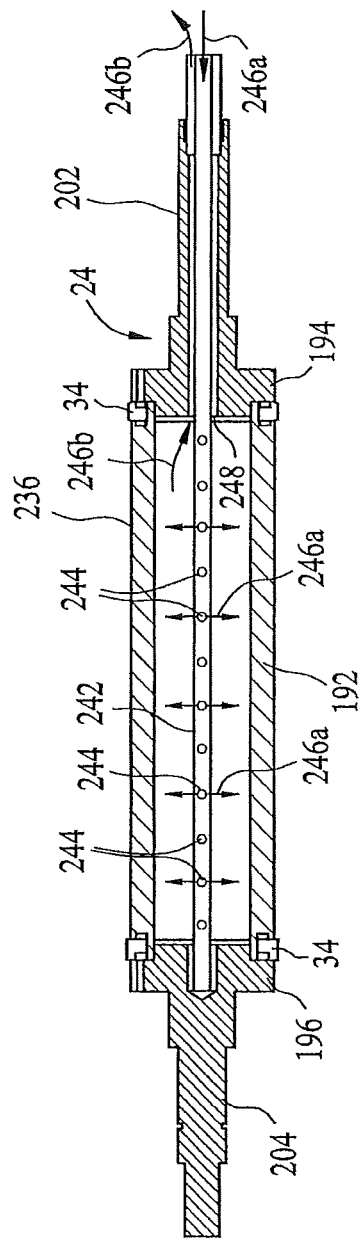
Figure 16:
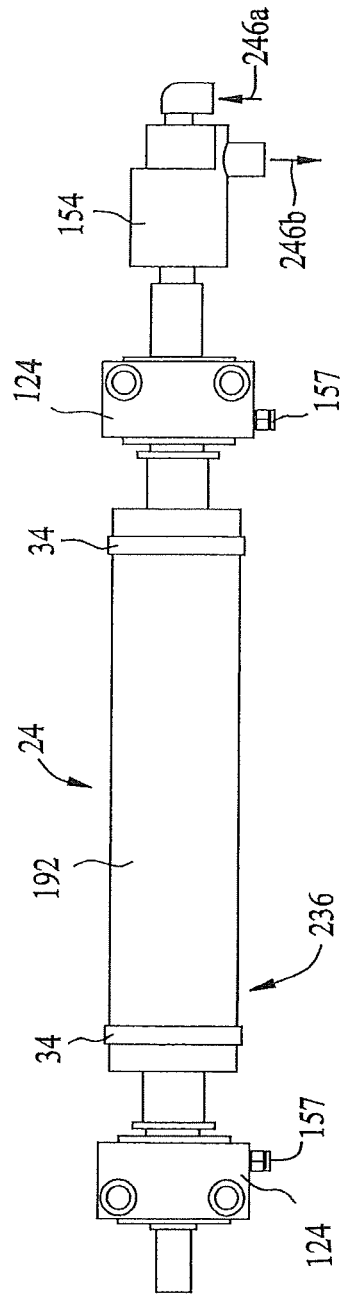
FIGS. 16 and 17 are plan and end views, respectively, of the cold sizing roll of FIGS. 14 and 15 mounted on bearing blocks.
Figure 17:
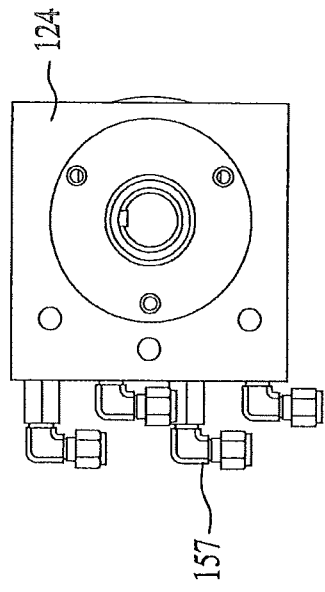

An electric motor 132, such as a servo or stepper motor, or other suitable rotational drive mechanism such as a pneumatic or hydraulic motor, rotationally drive the sizing rolls via right angle gear box 134, rotation gear box 136 for counter-rotating the inner and outer sizing rolls 24 and 26, and Schmidt couplings 144, 146, such that the sizing rolls are rotationally driven in opposite directions at a precision controlled speed. The gear box 134 may also be geared to serve as a gear reduction, for example, a 30-1, 50-1, or 20-1, for driving the sizing rolls with a relatively high torque. It will be appreciated that the right angle gear box may be eliminated by arranging the motor 132 with its output shafts parallel to the sizing rolls. The sizing rolls are rotationally driven with precise speed accuracy by the servo motor, which can be synchronized with the servo motor that rotationally drives the other roll modules 110 and 130. As illustrated in FIG. 13, the gearbox 136 includes a set of gears 138 for rotating the inner sizing roll 24 and the outer sizing roll 26 in opposite directions. The Schmidt couplings allow for relative translational movement of the shafts 202, 204 of the sizing rolls (which move relative to the frame 131) relative to the output shafts of the gear box 136 (which are fixed relative to the frame 131), while retaining the rotational drive connection there between and driving of the rolls at a precision controlled rotational speed with no velocity variations or ripple in the rotational speed of the rolls as is common with other types of translational/adjustable rotational drive couplings. The Schmidt couplings thereby reduce the creation of undesirable low frequency ripples in the glass that would otherwise be created by velocity ripple in the rotational speed of the rolls. As described in more detail hereinafter with reference to FIGS. 15-17, cooling fluid, for example, air, water or a mixture of air/water (mist, or other suitable coolant), is fed via flexible tubing into the sizing rolls through rotary fluid unions 154, 156 and into the precision bearing blocks through junctions 157.

As best seen in FIGS. 8-11, the shafts of each of the sizing rolls 24, 26 are mounted in liquid cooled precision bearing blocks 124 and 126, respectively. The bearing blocks 124 and 126 may incorporate quick change attachment features in order to facilitate the installation and removal of the sizing rolls for maintenance and other purposes. The bearing blocks 124 of a first or inner one 24 of the sizing roll 24, 26 are mounted on outer ends of the middle shafts 161. The inner ends of the middle shafts are attached to output shafts 162 of the pneumatic cylinders 128. Central portions of the middle shafts are slidingly journaled in bushings in holes through an inner plate 163 and outer plate 164 of the frame 131. The output shafts 162 of the cylinder extend from pistons in the pneumatic cylinder for driving the middle shaft back and forth as illustrated by arrow 167. The bearing blocks 126 of a second or outer sizing roll 26 are mounted on outer ends of the upper and lower shafts 158 and 159. The inner ends of the upper and lower shafts are attached to the housing or mounting plate of the pneumatic cylinders 128, such that the piston moves the middle shaft relative to the upper and lower shafts 158 and 159. Central portions of the upper and lower shafts 158, 159 are slidingly journaled in bushings in holes through the inner plate 163 and outer plate 164 of the frame 131 and through the bearing blocks 124 of the inner sizing roll 24.

Figure 10:
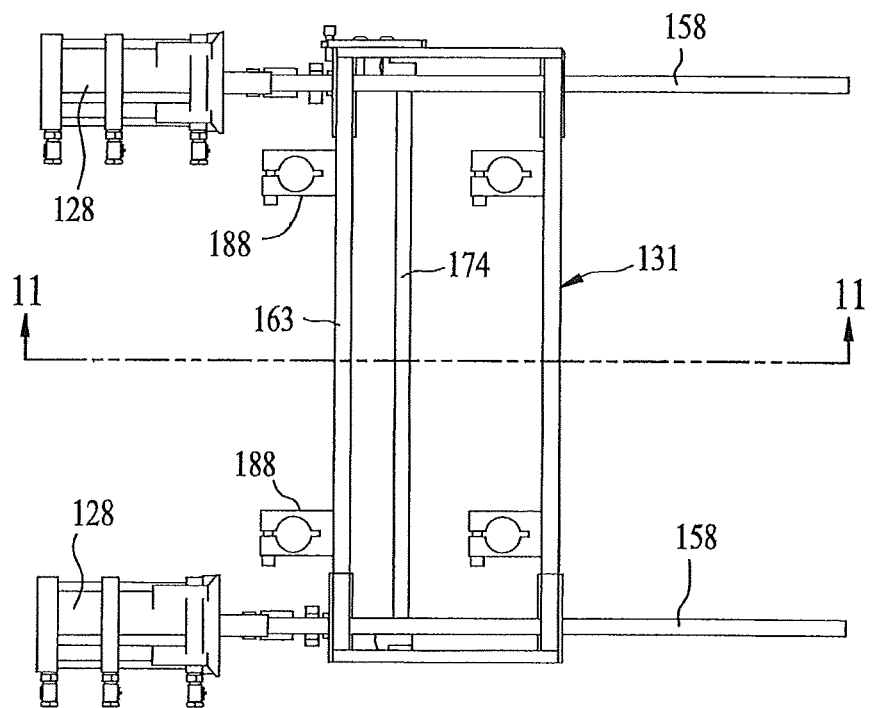
Figure 11:
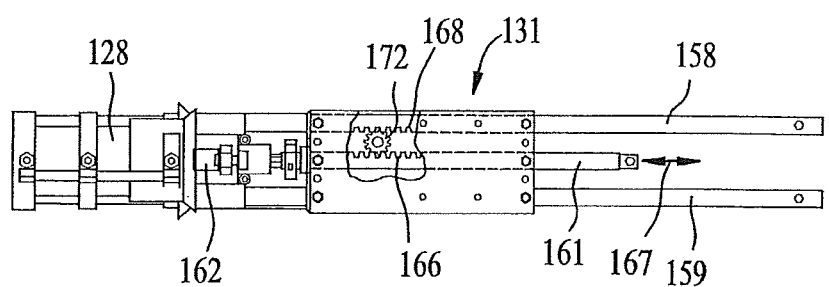
Figure 12:
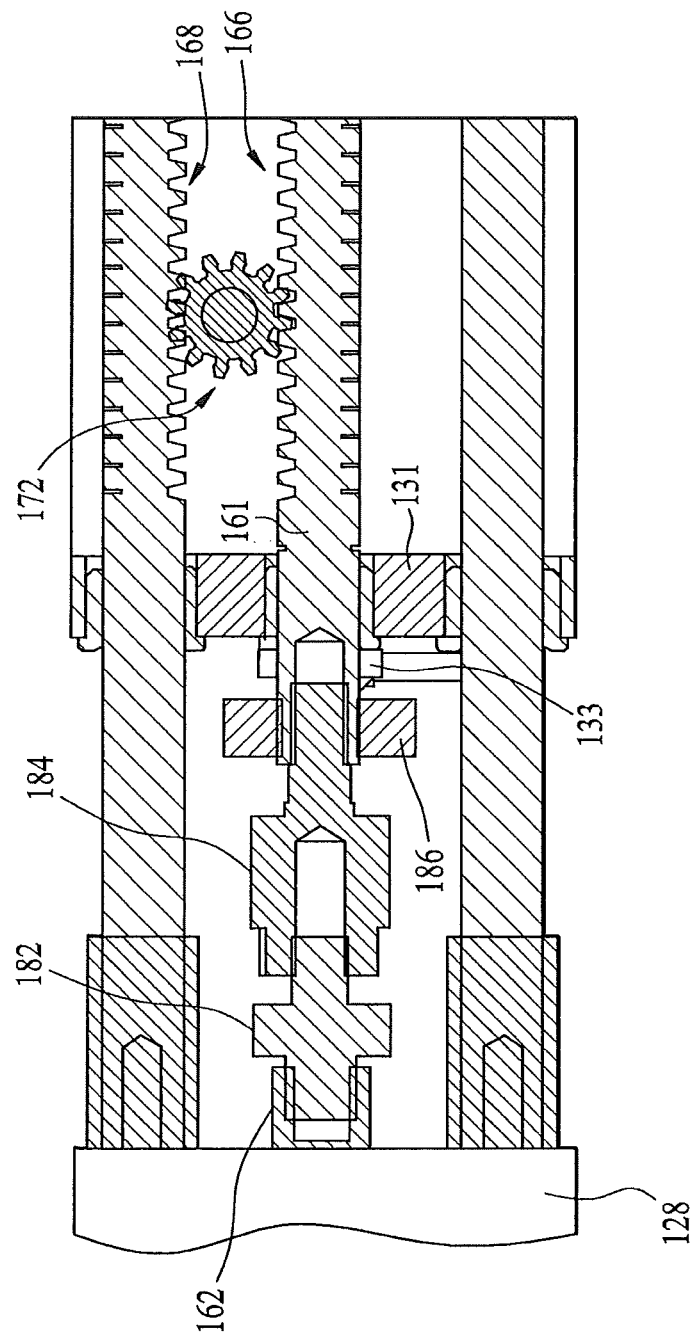
FIG. 12 is a partial cross-sectional side view of the sizing roll module of FIG. 8.

As best seen in FIGS. 11 and 12, gear teeth 166, 168 are formed in a central portion of the top surface of the middle shafts 161 and in the lower surface of the upper shaft 158, respectively. As seen in FIGS. 10-12, pinion gears 172 are provided on opposite ends of a torsion rod 174. The ends of the torsion rod are received in bushings or holes in the frame 131 in order to fix the location of the torsion rod in the frame 131. The pinion gears 172 engage the "rack" gears in the middle shafts 161 and upper shafts 158. Being mounted on the same torsion rod 174, both pinion gears 172 rotate at the same speed and thereby ensure that both ends of the inner and outer sizing rolls move toward and away from each other at the same speed and the sizing rolls 24 and 26 remain parallel to each other as they are moved toward and away from each other by the pneumatic cylinders 128. It was found that the upper shaft 158 and middle shaft 161 tend to warp or bend when they are formed with gear teeth 166, 168 in one side thereof, which can cause the shafts to bind in the frame or destroy the desired precise positioning of the sizing rolls and precise formation of the glass sizing gap between the sizing rolls. In order to prevent this warping of the toothed shafts, slots may be formed in the sides of the upper shafts and middle shafts opposite to the gear teeth 166, 168 as can be seen in FIG. 12.

It will be appreciated that the pinion gears 172 may engage gear teeth formed in the lower shaft 159, rather than gear teeth formed in the upper shaft 158 as illustrated in FIGS. 8-12. It will also be appreciated that the torsion rod 174 and pinion gears make it possible to optionally eliminate one of the pneumatic cylinders 128 and drive/move the sizing rolls toward and way from each other with just one pneumatic cylinder 128 that drives just one of the middle shafts 161.

As best seen in FIG. 12, the output shaft 162 of the pneumatic cylinder 128 may be connected to the middle shaft via an adapter 182, an alignment coupling 184 and an optional threaded locking collar 186. The adapter 182 mates the output shaft 162 with alignment coupler 184. The alignment coupler 184 is received in the end of the middle shaft 161 and aligns the middle shaft with the output shaft of the pneumatic cylinder. The threaded locking collar 186 adjusts the stroke of the middle shaft to adjust the gap between the inner and outer sizing rolls by contacting the plate 163 of the frame 131 (also see FIGS. 9 and 10).

The frame 131 may be mounted on vertical posts or columns (not shown) with mounting clamps or mounting blocks 188, such that the sizing rolls 24 and 26 are located directly below the glass feed slot 12 (or root 108 of the isopipe) with the glass ribbon centered between the inner sizing roll 24 and outer 26 sizing roll. In this way, when the sizing rolls 24 and 26 are pressed together by the cylinders, the glass ribbon will be received in the center of the nip of the sizing rolls. The posts or columns on which the frame 131 is mounted may be stationary columns or may be on a cart or other moveable platform along with the other modules 110, 130 for selectively locating the precision glass roll forming apparatus 10 under the glass feed slot or isopipe. The mounting clamps 188 provide infinite vertical adjustability of each module 110, 120, 130 along the vertical columns with respect to the glass feed slot or isopipe and with respect to the other modules.

The previously described embodiment of the sizing roll module 120 may incorporate three alternative methods for achieving precise gap control between the sizing rolls 24 and 26 when they are moved together by the cylinders 128. The first and most precise method is provided by the use of the previously described precision dimensioned spacer rings 34, 36 as illustrated in FIGS. 1-3, 7 and 8. Precise roll gap control is maintained using spacer rings regardless of slight eccentricities between the roll shafts and rolls or bearing blocks, bearing fit clearance/tolerance, or variable swelling of the shafts, bearings, bearing blocks or support structure at operating temperature.

Figure 8:
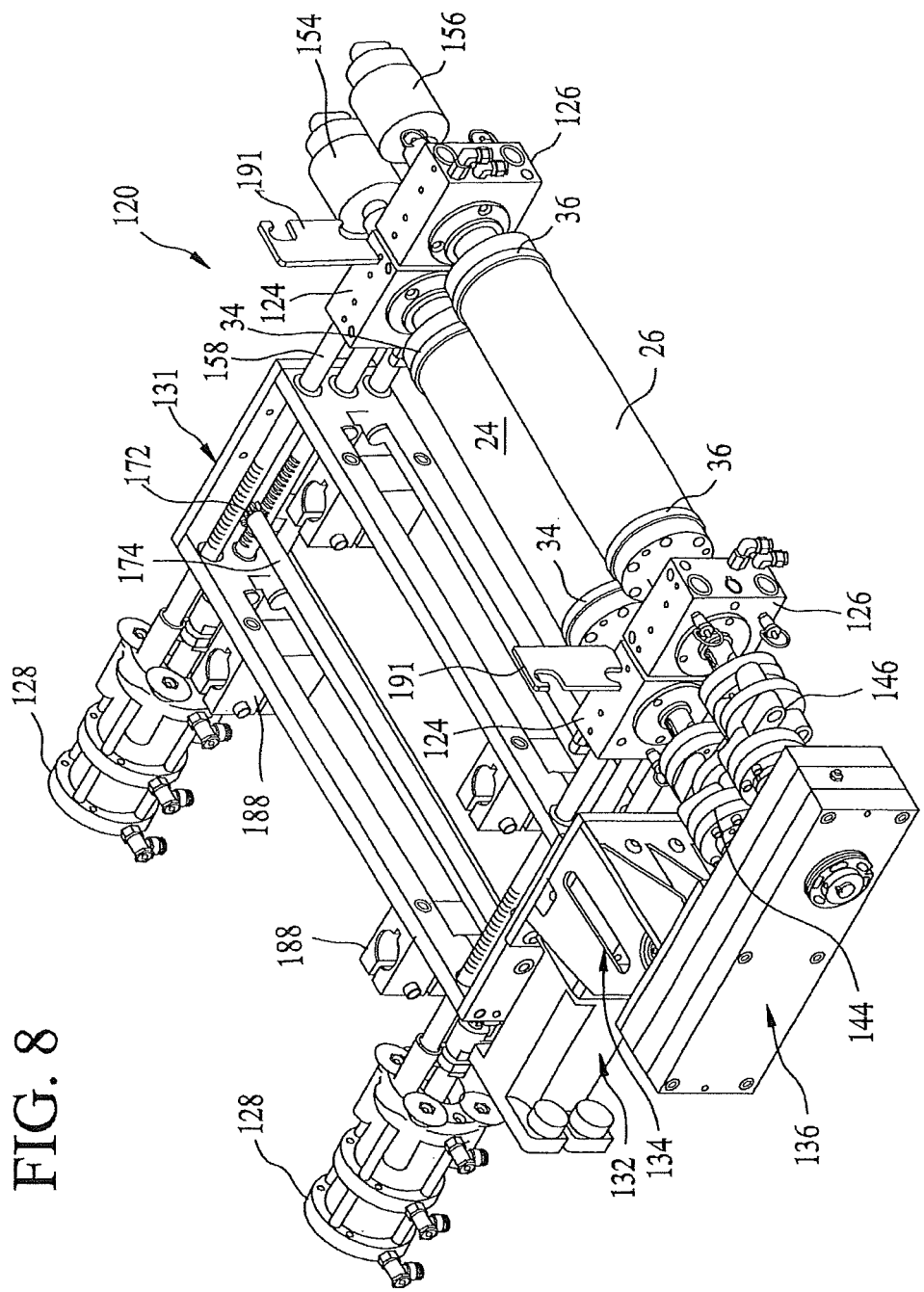
FIG. 8 is a perspective view of an embodiment of the sizing roll module of the high precision glass roll forming apparatus of FIG. 7.
Figure 9:
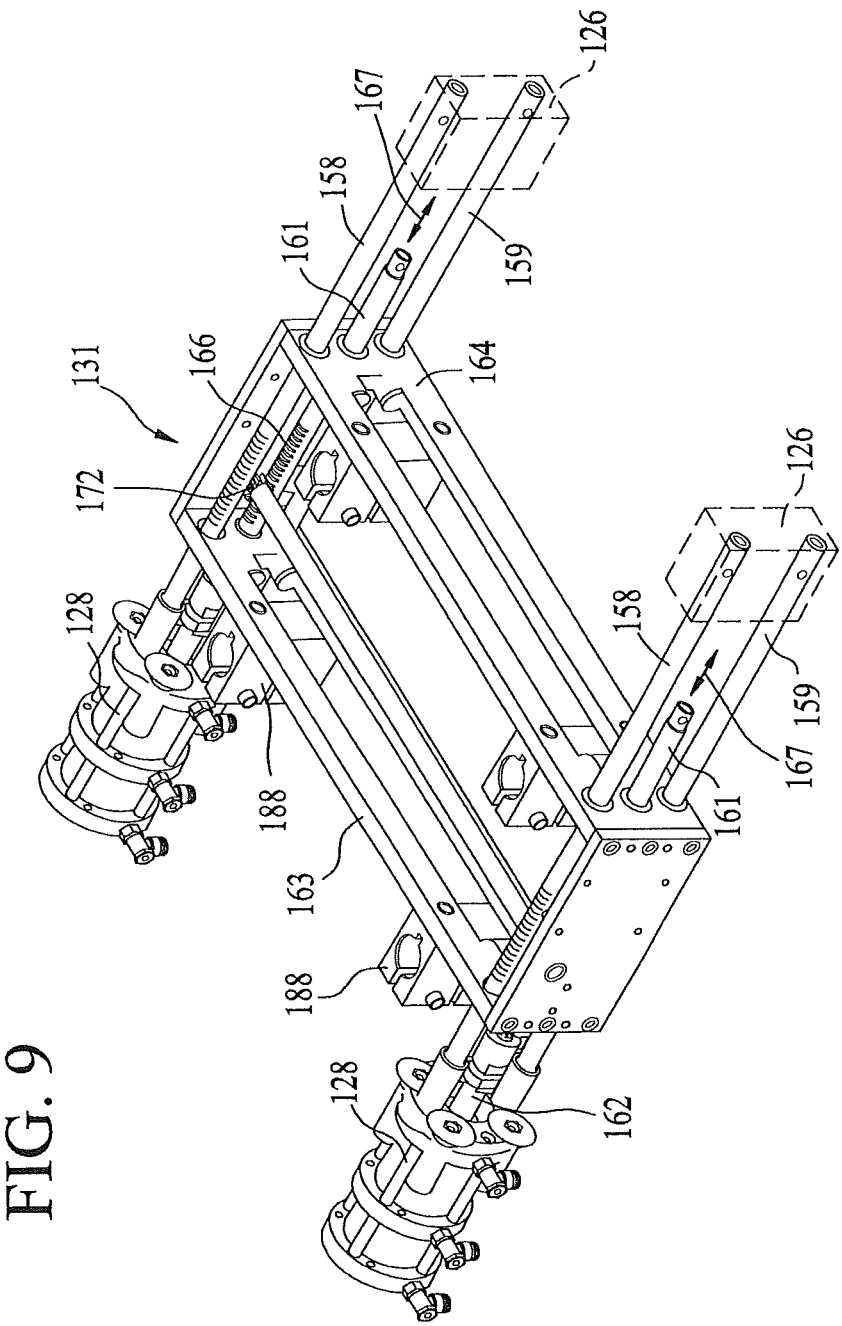
FIGS. 9, 10 and 11 are partial perspective, plan and partially broken away side views, respectively, of an embodiment of the sizing roll module of FIG. 8.

A second somewhat less accurate method of controlling the gap between the sizing rolls 24 and 26 may be provided using spacer shims 191 as illustrated in FIG. 8. Precision formed spacer shims 191 may be mounted between the bearing blocks 124 and 126 on each side of the module to provide precise gap control. The shims 191 may be formed to slip fit over the upper and lower shafts 158 and 159, such that shims of different thicknesses (or multiple shims to form different thicknesses) may be quickly and easily interchanged to change the size of the gap between the sizing rolls. With this method, eccentricities between the roll shafts and rolls or bearing blocks, bearing fit clearance/tolerance, or variable swelling of the shafts or rolls at operating temperature may cause slight variations in the size and uniformity of the gap between the sizing rolls with corresponding variations in the thickness control and uniformity of the resulting glass sheet 31. Shims enable quick and easy changes in roll gap, making this method ideal for research and development or prototyping environments.

A third and less accurate method of controlling the gap between the sizing rolls may be provided by the optional threaded locking collar 186 on the middle support shaft 161, as illustrated in FIG. 12. When the inner shafts are moved outward by the cylinders 128, the locking collar 186 contacts the frame 131 (or the bushing in the frame) to stop the motion of the middle shaft, and therefore the motion of the inner and outer sizing rolls with the desired gap defined between sizing rolls. The threaded locking collar is threaded on the end of the inner shaft 161, so that the locking collar 186 may be moved in and out along the inner shaft to vary the position at which the middle shaft is stopped and thereby vary or adjust the size of the gap between the sizing rolls. In yet another embodiment hereof, a collar drive device (not shown) may be incorporated into the module for turning the locking collar 186 and adjusting the gap between the sizing rolls during glass fabrication. Sensors (not shown), as are well understood in the art, may also be added to the sizing module or downstream of the module to monitor the process and monitor the sized glass ribbon 31, 131 being produced. In this way, when undesirable variations in the thickness or other parameters of the sized glass ribbon are detected by the sensors, then the gap between the sizing rolls may be adjusted in real time by driving the locking collar until the thickness of the glass ribbon or other parameter being sensed is again within acceptable limits. This adjustment may be manually controlled or automated.

The more readily adjustable nature of the second method of controlling the gap between the sizing rolls by using spacer shims 191 (see FIG. 8) may be advantageous in an experimental or developmental environment where it is necessary to make frequent changes in the gap to determine the optimal gap for a new glass composition, new operating temperature, new operating throughput, new glass ribbon thickness or new glass ribbon width, etc. Whereas the spacer rings 34, 36 may be more advantageous in a production environment where the gap between the sizing roll is fixed and a more precise glass ribbon thickness control is desired.

Turning now to FIGS. 14 through 17, an embodiment of the sizing rolls 24 and 26 will now be described with reference to inner sizing roll 24. It will be appreciated that the outer sizing roll 26 is identical to the inner sizing roll 24. As previously described the inner sizing roll 24 includes an insulating cylinder or coating 192. The insulating cylinder 192 is mounted between end caps 194 and 196. Shafts 202 and 204 may be integrally formed with the end caps for rotationally mounting the sizing roll in water cooled precision bearing blocks 124. The precision formed spacer rings 34 may be mounted in grooves formed between the ends of the insulating cylinder 192 and the end caps 194 and 196 (see FIG. 14). Outer cylindrical bearing surfaces of the spacer rings 34 extend beyond outer glass sizing surface 236 of the insulating cylinder 192 by a distance equal to one half of the desired final thickness of the glass ribbon 31. The outer cylindrical surface of the insulating cylinder 192 may include a thermal barrier layer (not shown) formed of an insulating material such as another ceramic material or combinations of ceramic materials in order to inhibit heat loss/transfer from the molten glass to the cylinder 192.

In order to maintain the insulating cylinder 192 of the inner sizing roll 24 at the desired relatively cold operating surface temperature of approximately 100° C., a coolant distributor or spray tube 242 with a plurality of distribution holes 244 is centrally located inside the insulating cylinder 192. Cooling fluid (or coolant) 246, such as water, air and water mist, or other suitable cooling fluid, is fed (246a) under pressure to the coolant distributor 242 via rotary fluid union 154. The cooling fluid 246a sprays from the distribution holes 244 onto the inner cylindrical surface of the insulating cylinder and cools the insulating cylinder 192. The heated cooling fluid 246b is removed from the interior of the insulating cylinder by way of an annular gap 248 between the spray tube 242 and the shaft 202 and rotary fluid union 154. The distribution holes 244 may be arranged in any desired pattern to achieve the desired cooling effect. For example, there may be more, e.g. a higher concentration of, cooling holes in the central portion of the sizing roll where more cooling is needed than in the end portions of the sizing roll.

During normal operation of the glass forming apparatus 10 the glass forming rolls 14, 16 are set with a glass forming gap formed between the forming rolls that is larger than the glass sizing gap formed between the sizing rolls 24, 26. The glass forming rolls 14, 16 may also be run at a slower speed/RPM than the sizing rolls 24, 26 below. Operating the sizing rolls at a higher RPM than the glass forming rolls creates a tension in and stretching of the sheet 21 between the glass forming rolls and the glass sizing rolls. Maintaining a tension in the glass sheet 21 helps to maintain the stability of the formed sheet 21 and 31 and may also be used to stretch and thin the formed glass sheet 21 before it enters the nip of the sizing rolls. For example, the glass sheet 21 may be formed by the forming rolls to a thickness of 2 mm and stretched and thinned between the forming rolls and the sizing rolls, prior to entering the sizing roll nip, where it may be sized to a thickness of 1 mm Note also that the roll gaps and roll speeds of the glass forming rolls, sizing rolls and optional pulling rolls may be appropriately selected such that the volume flow rate of glass through each roll set is equal.

Figure 18:
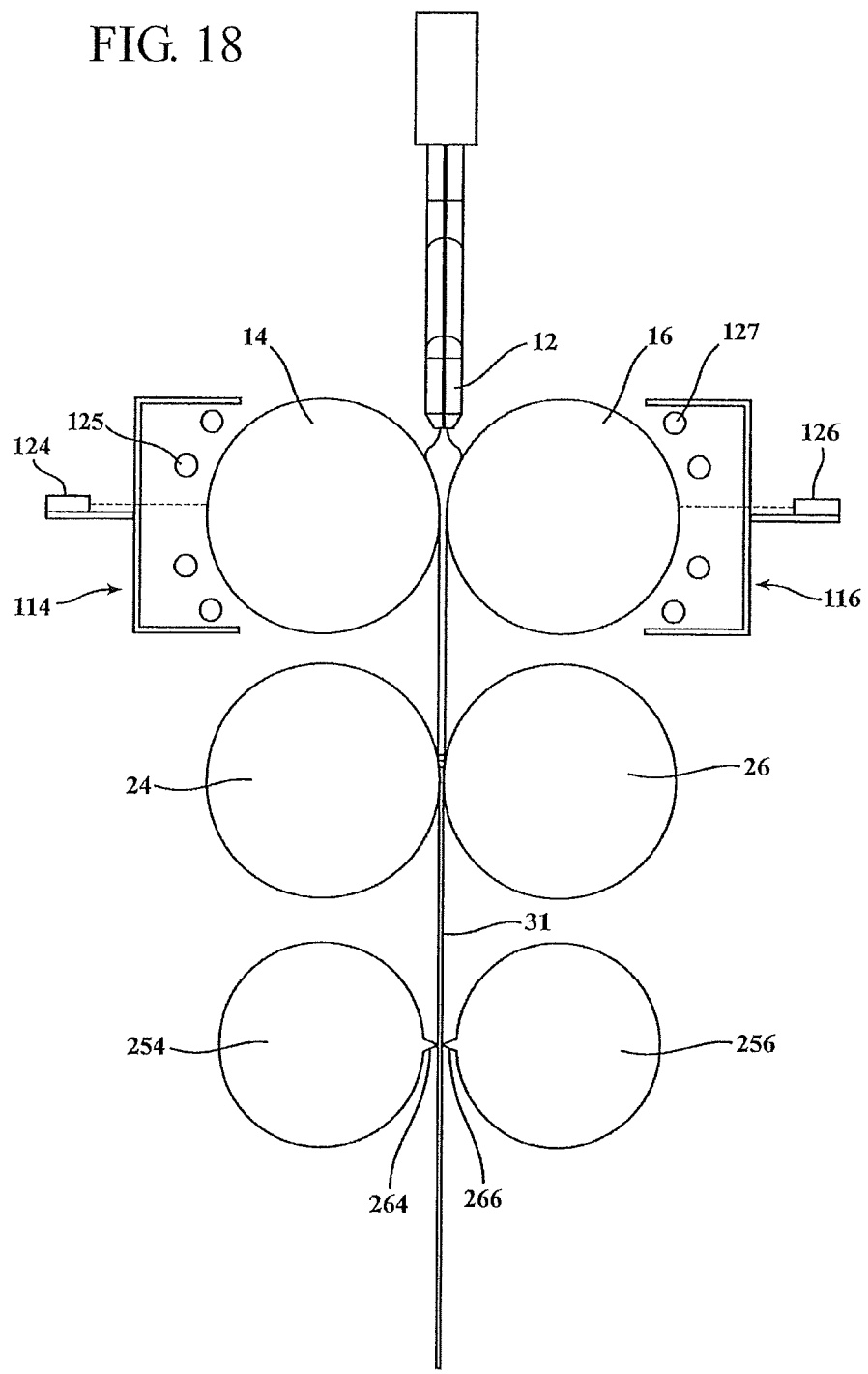
FIG. 18 is a schematic illustration of an embodiment of a high precision glass roll forming apparatus and process hereof with a glass cutting roll pair and forming roll radiant heaters.

The modular/stackable configuration of the glass roll forming apparatus described herein can be easily configured in many ways to enable a very large number of glass forming configurations and operations for a wide variety of glass compositions, glass sheet widths, glass sheet thicknesses, and glass sheet surface/thickness dimension control simply adding, subtracting and substituting different glass roll modules in the system. The electric motor 132, such as a servo or stepper motor, or other suitable rotational drive mechanism for rotationally driving the rolls in each of the modules may be independently and separately controlled, so that the rolls in each module may be rotationally driven independently of and at different speeds or torques than the rolls in the other modules, or at the same speed or torques as the rolls in one or more of the other modules. To accomplish this, sensors are employed in each module to sense the rotational speed and/or torque of each roll. A signal is sent from each sensor to a controller that then sends a signal to the rotational drive mechanism driving each roll to thereby control the rotational speed or torque of each roll to be within a desired operational range. In this way a roller pair may be driven at a rotational speed or torque that is somewhat higher than that of the roller pair just above it, in order to pull the glass ribbon between these two roller pairs/modules. For example, the upper pair of rollers may be driven at a lower speed that is at a specific ratio relative to or a percentage of the speed of the lower pair of rollers, such as a ratio in a range from about 9:10 to about 1:2 or a percentage, e.g. the upper rolls may be driven at a speed that is about 50% of the speed of the lower rolls to about 90% of the speed of the lower rolls The system can accommodate a wide variety of roll types formed of a wide variety of materials, such as, by way of example, forming rolls 14, 16 made of stainless steel or inconel, or ceramic coated stainless steel, and other suitable materials; sizing rolls 24, 26 made out of stainless steel with thermal insulating surfaces, such as ceramic coatings or sleeves, or other ceramic base materials, such as zirconia; and pulling rolls 44, 46 made out of stainless steel with ceramic coatings or sleeves or high temperature silicone coatings or sleeves, or other suitable materials. Rolls that may be used with the system hereof include, but are not limited to, the previously described forming, sizing and pulling rolls, as well as additional optional rolls such as rolls with edge trimmers or cutting rolls 254, 256 with glass cutters 264, 266 as illustrated in FIG. 18. The cutting rolls 254, 256 may be made out of steel or aluminum with hardened steel cutters.

The rotational speed of the cutter rolls may be synchronized with either the sizing roller speed or the glass ribbon speed. The rotational speed of the cutting rolls may be adjusted in order to cut a sheet of glass having a desired length from the glass ribbon. For example, if a relatively short glass sheet is desired, then the cutting rolls may be rotationally driven at a relatively high rotational speed (for example, 150% of the speed of the rotational speed of the sizing rolls) while the cutters are not in contact with the glass, so that the cutters quickly travel around the axis of the cutting rolls at a speed that may be faster than the velocity of the glass ribbon. The rotational speed of the cutting rolls is then decreased as the cutters 264, 266 approach the glass ribbon, so that the rotational speed of the cutting rolls is synchronized with the speed of the glass ribbon when the cutters come into contact with and cut the glass ribbon. The rotational speed of the cutting rolls is then increased as the cutters disengage from the glass ribbon and the process is repeated to cut another glass sheet from the glass ribbon. If a relatively long glass sheet is desired, then the cutting rolls may be rotationally driven at a relatively low rotational speed (for example, 50% of the speed of the rotational speed of the sizing rolls) while the cutters are not in contact with the glass, so that the cutters travel slowly around the axis of the cutting rolls at as speed that may be slower than the velocity of the glass ribbon. The rotational speed of the cutting rolls is then increased as the cutters 264, 266 approach the glass ribbon, so that the speed of the cutters is synchronized with the speed of the glass ribbon when the cutters come into contact with and cut the glass ribbon. In this way, any desired sheet length may be "dialed in" to the system controller for cutting out any desired length of glass sheet by adjusting the speed of the cutting rolls when the cutters are disengaged from the glass ribbon. Should a defect be detected in the glass ribbon, the controller may control the cutting rolls to cut the glass ribbon on either side of the defect and thereby cut the portion of the glass ribbon containing the defect from the glass ribbon. This defective piece is glass may then be discarded or recycled.

Radiant roll heaters 114, 116, schematically illustrated in FIG. 18, may optionally be mounted to the bearing blocks of the forming roll module 110 in order to move with the forming rolls 14, 16 (or alternatively to the frame 131) and facilitate the temperature control of the glass forming rolls 14, 16 (as illustrated in FIG. 18). As illustrated in FIG. 7, radiant heaters may also be mounted to one or more of the bearing blocks of the sizing roll module 120 to control the surface temperature of the glass sizing rolls 24, 26, and the bearing blocks of the pulling roll module 130 to control the surface temperature of the pulling rolls 44, 46, or any other roll modules incorporated into the glass forming apparatus hereof. The radiant heaters may include temperature sensors 124, 126 and radiant heating elements 125, 127.

The temperature sensors 124, 126 may be infrared sensors or optical pyrometers mounted with a line of sight to the forming surface of the glass forming rolls 14, 16, in order to sense the surface temperature of the surface of the glass forming rolls. A controller controls the current to the radiant heat elements in response to the temperature sensed by the temperature sensors in order to maintain the temperature of the surface of the glass forming rolls substantially constant at the desired operating surface temperature, e.g. at the operating temperature of about 500° C. to about 600° C. Infrared sensors and heaters may also be provided on the sizing roll module in order to control the temperature of the surface of the rolls at the sizing roll module.

Figure 19:
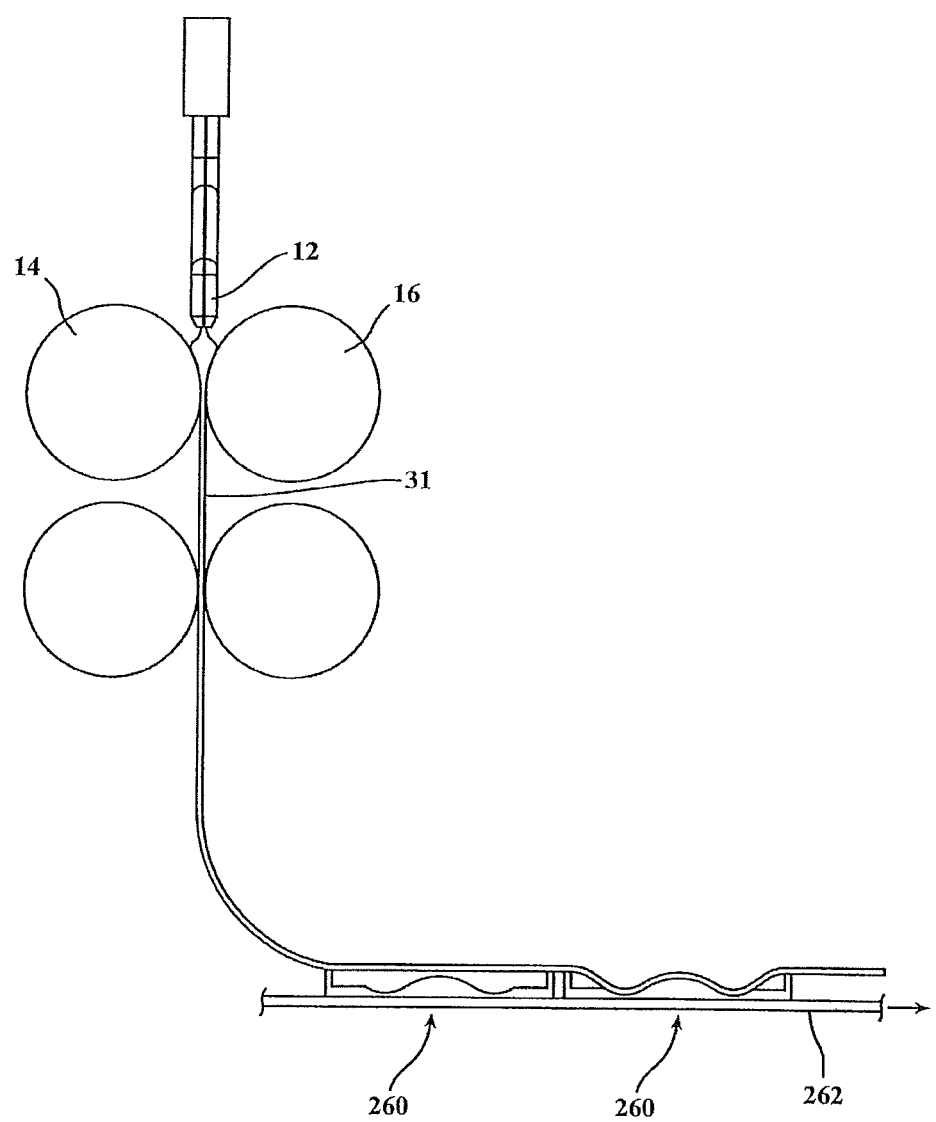
FIG. 19 is a schematic illustration of an embodiment of a high precision glass roll forming apparatus hereof with glass take out conveyor with heated vacuum glass forming molds 260.

This system hereof may be mated with a wide variety of glass take out and glass forming or finishing devices, including but not limited to, heated flat plate takeouts, vacuum glass forming molds 260 with female mold cavities, vacuum glass forming molds with support rings and female mold cavities, vacuum glass forming molds with support rings and male mold cavities, thin shelled vacuum glass forming molds mounted on a horizontal conveyor, flat belt conveyor glass sheet take out, horizontal vacuum glass forming machine systems, and hub machine vacuum glass forming machine systems. As illustrated in FIG. 19, a glass take out may include vacuum glass forming molds 260 on a conveyor 262. The vacuum molded glass panes would then be cut from the hardened glass ribbon and finished using conventional finishing processes The glass roll forming apparatus described herein is relatively low cost and directly scalable from prototype, to pilot, to commercial production, and is easily scalable to larger or smaller widths due to its compatibility with a multitude of glass delivery methods. The modular/stackable configuration of the glass forming system described herein enables the system to be easily customized and used as a research tool, a process or product development tool, a prototyping tool, or a commercial glass production system. When used as a research, prototyping or development tool, it may be advantageous to employ the bearing block 124, 126 and shim method of defining the gap between the sizing 24, 26 and/or forming rolls 14, 16 as previously described herein, so that the width of the gap may be quickly and reliably changed. Whereas the more precise spacer rings 36 method of defining the gap between the sizing 24, 26 and/or forming rolls 14, 16 may be advantageously employed for commercial production of glass sheets.

The precision glass roll forming apparatus and process described herein separates the function of sheet formation from the function of dimensional control. The initial glass sheet formation requires glass rolling to be performed at relatively high glass temperatures of about 1000° C. and higher, (for example from about 1000° C. to about 1500° C.), which is historically incapable of precision thickness control when forming thin sheets having a thickness of less than 2 mm. By the addition of a second pair (and potentially a third pair or more) of glass sizing rolls that are maintained at a much lower, relatively cold surface temperatures of 400° C. or lower, 300° C. or lower, or 200° C. or lower, the glass roll forming apparatus described herein may enable the precision formation of a very thin (e.g. 1 mm or thinner, 0.8 mm or thinner, or 0.75 mm or thinner) glass sheet having a precision thickness (e.g. within +/−0.025 mm or less) with very little sheet width attenuation between the first or top forming rolls and the final or bottom ceramic coated sizing rolls at high production rates/glass throughput/process speeds of 20 m/min or more. The precision glass roll forming apparatus hereof may also be used to form glass sheets up to 4 mm or more in thickness with precision thickness control. The roll may be up to 1200 mm or more in length and produce glass sheets up to 900 mm or more in width. The vertical configuration of the forming and sizing rolls eliminates the waviness created in the glass by horizontal or inclined roll forming configurations. The glass roll forming apparatus hereof may also be used to form glass at higher speeds than conventional roll forming devices. For example, the present apparatus hereof may form glass-ceramic sheet with a thickness of about 0.8-1.2 mm at a rate of about 500 mm of glass per second, whereas conventional roll forming devices may only be able to produce relatively thick sheets (6 mm to 12 mm) of glass at a rate of about 300-600 mm per minute.

The glass roll forming apparatus and process described herein also enables the precision thickness forming of a variety of glass and glass-ceramic compositions having relatively low viscosities of about 200 poise at the delivery temperature of the stream of glass at the glass forming rolls as well as glasses with a relatively high viscosity of about 10,000 poise at the glass forming rolls. The glass apparatus hereof is also capable of forming precision thickness glass sheets at relatively high production rates, such as 20 m/min to 36 m/min.

EXAMPLES

Various embodiments will be further clarified by the following examples.

Example 1

A continuous supply of molten glass-ceramic was supplied from a fish tail slot feed to a glass roll forming apparatus as illustrated in FIGS. 7-14 for an extended period of time (FIG. 7). The glass was delivered at a delivery temperature of approximately 1200° C., a viscosity at delivery was approximately 300 poise, and the delivery flow rate was approximately 300 pounds per hour. The apparatus included a top set of forming rolls made of stainless steel and a lower set of ceramic coated sizing rolls with a thermal barrier coating. The forming rolls were run at a "hot" surface temperature that was varied from a temperature of approximately 550° to approximately 580° C. The sizing rolls were run at a "cold" surface temperature of approximately 100° C. The glass was roll formed and sized at a linear speed of approximately 254 mm/sec. The samples were approximately 88 mm wide and cut to about 305 mm in length. The glass was marked with lines down the length of the sample at the center line and approximately one quarter inch in from each edge. Thickness measurements were made every inch along the sheet along each of those three lines. The thicknesses measured were within approximately +/−0.0125 mm of each other.

Observations from various experiments have included the following.

Glass sheets as thin as 0.7 mm can be produced using this type of glass forming system.

Roll surface temperature control was found to be a critical parameter that needs to be controlled in order to produce an acceptable product.

Best results were achieved with stainless steel glass roll forming surfaces on the glass forming rolls 14, 16 temperature controlled to a surface temperature of 580° C. to 600° C. measured with an optical pyrometer.

Forming roll surface temperatures below 580° C. resulted in surface haze or periodic thermal checks running side to side across the sheet.

Glass wrapping around the glass forming rolls was a distinct possibility if the roll surface temperatures were above 620° C.

The lower the roll surface temperatures, the faster the rolls needed to be run to prevent thermal checks or thermal crizzle-like haze. It is believed that this is due to increased thermal transfer of heat from the hot glass to the colder glass forming rolls or sizing rolls when the differences in temperature are larger.

It will be apparent to those skilled in the art that various modifications and variations can be made without departing from the spirit or scope of the invention.

What is claimed is:

1. A glass or glass-ceramic roll forming apparatus comprising:
a glass feed device for supplying a supplied stream of molten glass;
a pair of forming rolls maintained at a surface temperature of about 500° C. or higher, the forming rolls being spaced closely adjacent each other defining a glass forming gap between the forming rolls with the glass forming gap located vertically below the glass feed device for receiving the supplied stream of molten glass and thinning the supplied stream of molten glass between the forming rolls to form a formed glass ribbon having a formed thickness;
a pair of sizing rolls maintained at a surface temperature of about 400° C. or lower, the sizing rolls being spaced closely adjacent each other defining a glass sizing gap between the sizing rolls with the glass sizing gap located vertically below the forming rolls for receiving the formed glass ribbon and thinning the formed glass ribbon to produce a sized glass ribbon having a desired thickness and a desired thickness uniformity;

the sizing rolls comprising;
an insulating cylinder having an outer glass sizing surface,
a first pair of spacer rings mounted adjacent each end of the insulating cylinder of the first of the sizing rolls, and a second pair of spacer rings mounted adjacent each end of the insulating cylinder of the second of the sizing rolls, the first and second sizing rings comprising outer cylindrical bearing surfaces extending radially beyond the outer glass sizing surface of the respective insulating cylinder; and
a translational drive device for pressing the outer cylindrical bearing surfaces of the first and second sizing rolls together with the first pair of spacer rings engaging the second pair of spacer rings and thereby defining the glass sizing gap between the pair of sizing rolls.

2. The roll forming apparatus of claim 1, wherein the outer cylindrical glass sizing surfaces of each of the sizing rolls are formed with a radius and concentricity with the rotational axis of the sizing roll that varies by no more than +/−0.0125 mm, whereby the thickness of the sized glass ribbon varies by no more than +/−0.025 mm.

3. The roll forming apparatus of claim 2, wherein the sizing gap has a thickness of 1 mm or less, whereby the sized glass ribbon has a thickness 1 mm or less.

4. The roll forming apparatus of claim 3, wherein the sizing gap has a thickness of 0.8 mm or less, whereby the sized glass ribbon has a thickness 0.8 mm or less.

5. The roll forming apparatus of claim 3, wherein the forming gap has a thickness of about 1.5 mm to about 2 mm.

6. The roll forming apparatus of claim 1, further comprising a pair of pulling rolls located vertically below the sizing rolls for receiving the sized glass ribbon and creating a sufficient tension on the sized glass ribbon to at least one of stabilize and draw the sized glass ribbon.

7. The roll forming apparatus of claim 1, wherein a central portion of the forming rolls have a smaller outer diameter than outer edge portions of the forming rolls, whereby the glass ribbon is formed with a central region that is thicker than outer regions of the glass ribbon.

8. The roll forming apparatus of claim 1, wherein the sizing rolls are each one of formed of and coated with a heat insulating material.

9. The roll forming apparatus of claim 8, wherein the sizing rolls are each one of formed of and coated with a ceramic material.

10. The roll forming apparatus of claim 8, wherein the sizing rolls are each formed of an inner metal cylinder and an outer heat insulating ceramic layer.

11. The roll forming apparatus of claim 8, wherein the sizing rolls are each formed of a hollow cylinder and a coolant tube supplies cooling fluid to an interior surface of the corresponding sizing roll.

12. The roll forming apparatus of claim 11, wherein the coolant tube comprises a spray tube that extends substantially the entire length of the interior of the hollow cylinder, and a plurality of spray holes are formed along the spray tube for spraying cooling fluid against an interior surface of the hollow cylinder.

13. The roll forming apparatus of claim 12, wherein there is a higher concentration of spray holes in a central region of the spray tube than in end regions of the spray tube, whereby a central region of the hollow cylinder receives a larger volume of cooling fluid than end regions of the hollow cylinder.

14. The roll forming apparatus of claim 8, wherein the spacer rings are precision formed to define the glass sizing gap with a width of about 1 mm or thinner when the pair of sizing rolls are pressed together.

15. The roll forming process of claim 14, wherein an outer peripheral surface of each of the ceramic outer cylinders are precision formed with a surface concentricity variation of no more than +/−0.0125 mm.

16. The roll forming apparatus of claim 1, wherein the pair of sizing rolls include a first sizing roll and a second sizing roll and are included in a sizing roll module, the sizing roll module further comprising:
a frame;
a first sizing roll support shaft having inner and outer ends and a second sizing roll support shaft have inner and outer ends, the first sizing roll support shaft and the second sizing roll support shaft being horizontally and slidingly mounted in the frame parallel to each other and at the same height, with the first sizing roll rotationally mounted on the outer ends of the first and second sizing roll support shafts;
a third sizing roll support shaft having inner and outer ends and a fourth sizing roll support shaft have inner and outer ends, the third sizing roll support shaft and the fourth sizing roll support shaft being horizontally and slidingly mounted in the frame parallel to each other and at the same height below the first and second sizing roll support shafts, with the second sizing roll mounted on the outer ends of the third and fourth sizing roll support shafts at the same height as and parallel to the first sizing roll;
a sizing module translational drive device for translationally driving one of (i) the first and second sizing roll support shafts, and therefore the first sizing roll, and (ii) the third and fourth sizing roll support shafts, and therefore the second sizing roll, forward and back relative to the frame; and
a synchronizing mechanism for translationally driving the other one of (i) the first and second sizing roll support shafts, and therefore the first sizing roll, and (ii) the third and fourth sizing roll support shafts, and therefore the second sizing roll, forward and back relative to the frame in a direction opposite the direction of the one of (i) the upper sizing roll support shafts, and therefore the first sizing roll, and (ii) the lower sizing roll support shafts, and therefore the second sizing roll, are translationally driven, whereby the first sizing roll and the second sizing rolls are selectively moved (i) together to define the glass sizing gap between the sizing rolls and (ii) apart.

17. The roll forming apparatus of claim 16, wherein the synchronizing mechanism comprises:
first gear teeth on a side of the first sizing roll support shaft facing the third sizing roll support shaft;
third gear teeth on a side of the third sizing roll support shaft facing the first sizing roll support shafts; and
a first pinion gear rotationally mounted to the frame in engagement with the first gear teeth and the third gear teeth, thereby ensuring that the opposing ends of the first and second sizing rolls move in synchronicity with each other.

18. The glass roll forming apparatus of claim 17, wherein the synchronizing mechanism further comprises:
second gear teeth on a side of the second sizing roll support shaft facing the fourth sizing roll support shaft;
fourth gear teeth on a side of the fourth sizing roll support shaft facing the second sizing roll support shafts; a torsion rod rotationally mounted to the frame; and
wherein the first pinion gear is affixed to the torsion rod and a second pinion gear affixed to the torsion rod with the second pinion gear in engagement with the third gear teeth and the fourth gear teeth, and thereby ensures that the first and second sizing rolls move parallel to and in synchronicity with each other.

19. The roll forming apparatus of claim 16, further comprising at least two said sizing roll modules, one located vertically below the other and aligned on the same vertical plane.

20. The roll forming apparatus of claim 16, wherein the pair of forming rolls include a first forming roll and a second forming roll that are included in a forming roll module, the forming roll module further comprising:
   a forming roll frame;
   a first forming roll support shaft having inner and outer ends and a second forming roll support shaft have inner and outer ends, the first forming roll support shaft and the second forming roll support shaft being horizontally and slidingly mounted in the frame parallel to each other and at the same height, with the first forming roll rotationally mounted on the outer ends of the first and second forming roll support shafts;
   a third forming roll shaft having inner and outer ends and a fourth forming roll support shaft have inner and outer ends, the third forming roll support shaft and the fourth forming roll support shafts being horizontally and slidingly mounted in the frame parallel to each other and at the same height below the first and second forming roll support shafts, with the second forming roll mounted on the outer ends of the third and fourth forming roll support shafts at the same height as and parallel to the first forming roll;
   a forming module translational drive device for driving one of (i) the first and second forming roll support shafts, and therefore the first forming roll, and (ii) the third and fourth forming roll support shafts, and therefore the second forming roll, forward and back relative to the frame; and
   a synchronizing mechanism for driving the other one of (i) the first and second forming roll support shafts, and therefore the first forming roll, and (ii) the third and fourth forming roll support shafts, and therefore the second forming roll, forward and back relative to the frame in a direction opposite the direction of the one of (i) the upper forming roll support shafts, and therefore the first forming roll, and (ii) the lower forming roll support shafts, and therefore the second forming roll, are translationally driven, whereby the first forming roll and the second forming rolls are selectively moved (i) together to define a desired gap between the forming rolls and (ii) apart.

21. The forming apparatus of claim 16, further comprising threads on one of (i) the first and second sizing roll support shafts and (ii) the third and fourth sizing roll support shafts and a threaded locking collar on the threads that contacts the frame to stop the motion of the sizing rolls toward each other and thereby define a desired sizing gap between sizing rolls.

22. The roll forming apparatus of claim 16, further comprising a collar drive device that turns the locking collar on the threads and thereby adjusting the thickness of the desired sizing gap between the sizing rolls.

23. The roll forming apparatus of claim 22, further comprising a sensor that detects the thickness of the sized glass ribbon and the collar drive device turns the locking collar in response to the thickness of the sized glass ribbon detected by the sensor to maintain the sized glass ribbon thickness within acceptable limits.

24. The roll forming apparatus of claim 23, wherein at least one of the forming roll module and sizing roll module further comprise infrared sensors for sensing the surface temperature of the rolls in the module and infrared heaters for controlling the surface temperature of the rolls in response to the temperature sensed by the sensors.

25. The roll forming apparatus of claim 1, wherein the apparatus is formed of a plurality of modules, including at least one forming roll module containing the pair of forming rolls and at least one sizing roll module containing the pair of sizing rolls, whereby the glass ribbon forming operation is separated from the glass ribbon sizing operation.

26. The roll forming apparatus of claim 25, wherein there are at least two sizing roll modules arranged one below the other, whereby a partially sized ribbon of glass from a first of the sizing roll modules is received by the sizing rolls of a second of the sizing roll modules to produce the sized glass ribbon.

27. The roll forming apparatus of claim 25, further comprising a glass take out device located below the one or more sizing roll modules for receiving the sized glass ribbon, the glass take out device comprising one of a plurality of (i) vacuum glass forming molds on a conveyor and (ii) a flat conveyor.

28. The roll forming apparatus of claim 25, wherein each of the modules further comprises a rotational drive mechanism for rotationally driving the rolls in the corresponding module that is independently and separately controlled from the drive rotational mechanisms of the other modules.

29. The roll forming apparatus of claim 28, further comprising a controller for controlling one of the rotational speed or torque of each of the rolls in each of the modules; and
   wherein each of the modules further comprises sensors that sense the rotational speed or torque of each roll in the corresponding module and sends a corresponding signal to the controller and, in response to the signal, the controller controls one of the speed and the torque of each roll to be within a desired operational range.

30. The roll forming apparatus of claim 29, further comprising a cutting roll module having a pair of cutting rolls located below the sizing roll module, and at least one of the cutting rolls has a cutter for cutting a glass sheet from the glass ribbon.

31. The roll forming apparatus of claim 30, wherein the controller controls the rotational speed of the cutting rolls while the cutter is disengaged from the glass ribbon such that a desired length glass sheet is cut from the glass ribbon.

32. The roll forming apparatus of claim 1, further comprising:
   a first pair of bearing blocks rotationally mounting the first of the sizing rolls, and a second pair of bearing blocks rotationally mounting the second of the sizing rolls, the translational drive device moving the first pair of bearing blocks and the second pair of bearing blocks toward and away each other; and
   a plurality of pairs of shims of varying thickness for selectively placing a select pair of shims having a select thickness between the first pair of bearing blocks and the second pair of bearing blocks, whereby when the translational drive device moves the first pair of bearing blocks and the second pair of bearing blocks toward each other into engagement with the select pair of shims a glass sizing gap having a select thickness is formed between the sizing rolls.

33. The roll forming apparatus of claim 1, further comprising a rotational drive mechanism for rotationally driving the pair of sizing rolls and a Schmidt coupling that couples the rotational drive mechanism to the pair of sizing rolls, whereby the pair of sizing rolls are rotationally driven with no velocity variations in the rotational speed of the sizing rolls.

34. A glass or glass-ceramic roll forming process comprising the steps of:
   supplying a vertical stream of molten glass from a glass feed device;
   forming the supplied stream of molten glass or glass-ceramic with a pair of forming rolls maintained at a surface temperature of about 500° C. or higher or about 600° C. or higher to form a formed glass ribbon having a formed thickness, the forming rolls being spaced closely adjacent each other defining a glass forming gap between the forming rolls with the glass forming gap located vertically below the glass feed device;
   sizing the formed ribbon of glass with a pair of sizing rolls maintained at a surface temperature of about 400° C. or lower to produce a sized glass ribbon having a desired thickness less than the formed thickness and a desired thickness uniformity, the sizing rolls being spaced closely adjacent each other defining a glass sizing gap between the sizing rolls with the glass sizing gap located vertically below the forming rolls,
   wherein the sizing rolls further comprise
   an insulating cylinder having an outer glass sizing surface,
   a first pair of spacer rings mounted adjacent each end of the insulating cylinder of the first of the sizing rolls, and a second pair of spacer rings mounted adjacent each end of the insulating cylinder of the second of the sizing rolls, the first and second sizing rings comprising outer cylindrical bearing surfaces extending radially beyond the outer glass sizing surface of the respective insulating cylinder; and
   wherein a translational drive device presses the outer cylindrical bearing surfaces of the first and second sizing rolls together with the first pair of spacer rings engaging the second pair of spacer rings and thereby precisely defining a glass sizing gap between the pair of sizing rolls.

35. The process of claim 34, the sizing step comprises maintaining the pair of sizing rolls at a surface temperature of about 300° C. or lower.

36. The process of claim 34, the sizing step comprises maintaining the pair of sizing rolls at a surface temperature of about 200° C. or lower.

37. The process of claim 34, wherein the thickness uniformity of the sized glass ribbon varies by no more than +/−0.025 mm.

38. The process of claim 37, wherein the sized glass ribbon has a thickness of 1 mm or less.

39. The process of claim 37, wherein the formed glass ribbon has a thickness of about 1.5 mm to about 2 mm.

40. The process of claim 34, wherein the glass feed device feeds the stream of molten glass to the forming rolls at a glass temperature of about 1000° C. or higher.

41. The process of claim 34, further comprising pulling the sized glass ribbon and creating a sufficient tension on the sized glass ribbon to at least one of stabilize and draw the sized glass ribbon.

42. The process of claim 34, wherein the molten glass is supplied at glass viscosity in a range of from about 200 poise to about 10,000 poise.

43. The process of claim 34, wherein the molten glass is supplied at glass viscosity in a range of from about 10,000 poise or higher.

44. The process of claim 34, wherein the molten glass is supplied to a center a nip formed between the pair of forming rolls such that a puddle of molten glass is formed at the nip of the forming rolls.

45. The process of claim 44, wherein the puddle of molten glass has a thickness of about 10 mm to about 20 mm.

46. The process of claim 34, wherein the pair of forming rolls and the pair of sizing rolls are centered on a vertical plane defined by the vertical stream of molten glass.

47. The process of claim 34, wherein the pair of glass sizing rolls are rotationally driven at a higher speed than the glass forming rolls to at least one create a vertical tension in the formed glass ribbon and draw the formed glass ribbon.

48. The process of claim 47, wherein the pair of glass forming rolls are spaced to define a glass forming gap between the glass forming rolls and the pair of glass sizing rolls are spaced to define a glass sizing gap between the glass sizing rolls that is smaller than the glass forming gap.

49. The process of claim 34, wherein the pair of glass forming rolls are spaced to define a glass forming gap between the glass forming rolls and the pair of glass sizing rolls are spaced to define a glass sizing gap between the glass sizing rolls that is smaller than the glass forming gap.

50. The process of claim 34, wherein the sizing rolls are each formed of a heat insulating material.

51. The process of claim 50, wherein the sizing rolls are each formed of a metal inner cylinder and a heat insulating ceramic outer layer.

52. The process of claim 51, wherein the sizing rolls are each cooled by distributing a cooling fluid to the interior surface of the metal inner cylinder.

53. The process of claim 34, further comprising:
   sensing a temperature of the surface of at least one of the forming rolls and the sizing rolls; and
   heating the surface of at least one of the forming rolls and the sizing rolls thereby controlling the surface temperature of the rolls in response to the temperature sensed by the sensors.

54. The process of claim 34, wherein a central portion of the forming rolls have a smaller outer diameter than outer portions of the forming rolls, whereby that the glass ribbon is formed with a central region that is thicker than outer regions of the glass ribbon.

55. The process of claim 34, wherein the forming step forms a glass ribbon having a central portion with a greater thickness than outer edge portions of the glass ribbon.

56. The process of claim 34, wherein the supplying step supplies one of (i) a variable flow of glass and (ii) a discontinuous flow of glass.

57. The process of claim 34, wherein the pair of sizing rolls are rotationally driven with no velocity variations in the rotational speed of the sizing rolls.

58. The process of claim 34, further comprising controlling the rotational velocity or torque of each pair of rolls independently and separately from the other pair of rolls.

59. The process of claim 58, further comprising:
   a pair of cutting rolls located below the sizing rolls, at least one of the cutting rolls having a cutter for cutting a glass sheet from the glass ribbon; and
   controlling the rotational speed of the pair of cutting rolls while the at least one cutter is disengaged from the glass ribbon such that a desired length glass sheet is cut from the glass ribbon.

* * * * *